United States Patent
Voit et al.

(10) Patent No.: US 6,215,790 B1
(45) Date of Patent: Apr. 10, 2001

(54) AUTOMATIC CALLED PARTY LOCATOR OVER INTERNET WITH PROVISIONING

(75) Inventors: Eric A. Voit, Baltimore, MD (US); Robert D. Farris, Sterling, VA (US)

(73) Assignee: Bell Atlantic Network Services, Inc., Arlington, VA (US)

( * ) Notice: Subject to any disclaimer, the term of this patent is extended or adjusted under 35 U.S.C. 154(b) by 0 days.

(21) Appl. No.: 08/815,367

(22) Filed: Mar. 11, 1997

Related U.S. Application Data

(63) Continuation-in-part of application No. 08/811,714, filed on Mar. 6, 1997, which is a continuation-in-part of application No. 08/812,075, filed on Mar. 6, 1997.

(51) Int. Cl.[7] ............................ H04L 12/28; H04L 12/56; H04L 12/66
(52) U.S. Cl. ............................ 370/401; 370/354; 370/467
(58) Field of Search ................................ 370/352, 353, 370/354, 355, 356, 400, 401, 467; 379/58

(56) References Cited

U.S. PATENT DOCUMENTS

| | | | |
|---|---|---|---|
| 4,313,035 | 1/1982 | Jordan et al. | 379/207 |
| 4,611,094 | 9/1986 | Asmuth et al. | 379/201 |
| 4,611,096 | 9/1986 | Asmuth et al. | 379/207 |
| 4,734,931 | 3/1988 | Bourg et al. | 379/93.01 |
| 4,788,718 | 11/1988 | McNabb et al. | 379/113 |
| 4,872,160 | 10/1989 | Hemmady et al. | 370/353 |
| 4,897,874 | 1/1990 | Lidinsky et al. | 380/3 |
| 4,899,373 | 2/1990 | Lee et al. | 379/207 |
| 4,958,341 | 9/1990 | Hemmady et al. | 370/352 |
| 5,185,860 | 2/1993 | Wu | 709/224 |
| 5,195,086 | 3/1993 | Baumgartner et al. | 370/264 |
| 5,206,901 | 4/1993 | Harlow et al. | 379/211 |
| 5,247,571 | 9/1993 | Kay et al. | 379/207 |
| 5,260,986 | 11/1993 | Pershan | 455/413 |
| 5,272,749 | 12/1993 | Masek | 379/216 |
| 5,341,374 | 8/1994 | Lewen et al. | 370/450 |
| 5,347,633 | 9/1994 | Ashfield et al. | 709/238 |
| 5,353,331 | 10/1994 | Emery et al. | 455/461 |

(List continued on next page.)

OTHER PUBLICATIONS

"Computer Telephony over the Internet", Grigonis, Richard, CT and the Net, Mar. 1996.

(List continued on next page.)

*Primary Examiner*—Hassan Kizou
*Assistant Examiner*—John Pezzlo
(74) *Attorney, Agent, or Firm*—McDermott, Will & Emery

(57) ABSTRACT

A system and method using enhanced processing, responsive to domain name translation requests, to provide selective routing services through a public packet switched data network. The name processing applies to translation of a domain name into a group of Internet Protocol (IP) addresses and to providing routing information for a packet data network such as the Internet. Following name translation into a group of addresses communication is automatically established between a calling terminal and a terminal designated by one of the addresses and determined through processing which effects linkage with the first terminal to respond. The selective routing is particularly advantageous for processing of voice telephone communications through the Internet packet data network based on domain name translations. One or more domain names can be translated into a group of addresses which may include a mixture of Internet (IP) addresses and telephone number addresses, along with routing procedures with respect to the addresses. The system is designed to provide called party locator services offering a variety of options to the customer for the procedures to be followed. An important feature is a convenient and efficient provisioning method using an advanced intelligent network provided with one or more intelligent peripheral platforms.

6 Claims, 16 Drawing Sheets

U.S. PATENT DOCUMENTS

| | | | |
|---|---|---|---|
| 5,361,256 | 11/1994 | Doeringer et al. | 370/390 |
| 5,375,068 | 12/1994 | Palmer et al. | 709/204 |
| 5,410,754 | 4/1995 | Klotzbach et al. | 370/466 |
| 5,425,028 | 6/1995 | Britton et al. | 370/389 |
| 5,434,913 | 7/1995 | Tung et al. | 379/202 |
| 5,475,748 | 12/1995 | Jones | 379/211 |
| 5,479,494 | 12/1995 | Clitherow | 379/144 |
| 5,487,111 | 1/1996 | Slusky | 379/211 |
| 5,490,247 | 2/1996 | Tung et al. | 345/501 |
| 5,493,568 | 2/1996 | Sampat et al. | 370/261 |
| 5,506,887 | 4/1996 | Emery et al. | 455/461 |
| 5,526,489 | 6/1996 | Nilakantan et al. | 709/228 |
| 5,572,583 | 11/1996 | Wheeler, Jr. et al. | 379/207 |
| 5,608,786 | 3/1997 | Gordon | 370/352 |
| 5,724,355 | 3/1998 | Bruno et al. | 370/401 |
| 5,726,984 | 3/1998 | Kubler et al. | 370/349 |
| 5,742,668 * | 4/1998 | Pepe et al. | 379/58 |
| 5,867,495 * | 2/1999 | Elliott et al. | 370/352 |

OTHER PUBLICATIONS

"Geek of the Week", Karn, Phil et. al., Internet Talk Radio, Mobile IP Networking, Nov. 1993.

"How to Build an Internet PBX", McConnell, Brian, http://www.phonezone.com/ip–phone.htm, pp. 1–9.

"Welcome to the Phone Zone", Pacific Telephony Design, http://www.phonezone.com/index2.htm, pp. 1–6.

"Innovations in Internet Telephony: The Internet as the Competitor to the POTS Network", Sears, Andrew, Innovations in Internet Telephony: The Internet as the Successor to the POTS Network, Feb. 28, 1996, pp. 1–6.

"Computer Telephony and the Internet", Stylus Innovation, http://www.stylus.com/hvml.htm.

"Routing Information Protocol", Hedrick, C., Jun. 1988, http://www.internic.net/rfc/rfc1058.txt, pp. 1–30.

"An Experimental Multiple–Path Routing Algorithm", Mills, D.L., Mar. 1986, http://www.internic.net/rfc/rfc981.txt, pp. 1–20.

"A Border Gateway Protocol (BGP)", Lougheed et al., Jun. 1990, http://www.internic.net/rfc/rfc1163.txt, pp. 1–26.

"Host Extensions for IP Multicasting", S. Deering, Aug. 1989, http://www.internic.net/rfc/rfc1112.txt, pp. 1–16.

"Distance Vector Multicast Routing Protocol", Waitzman et al., Nov. 1988, http://www.internic.net/rfc/rfc1075.txt, pp. 1–22.

"The DARPA Internet Gateway", Hinden et al., Sep. 1982, http://www.internic.net/rfc/rfc823.txt, pp. 1–41.

* cited by examiner-

AUTOMATIC CALLED PARTY LOCATOR OVER INTERNET WITH PROVISIONING

RELATED APPLICATIONS

This application a continuation-in-part of application Ser. No. 08/811,714, filed Mar. 6, 1997, entitled "Automatic Called Party Locator Over Internet", which is a continuation-in-part of application Ser. No. 08/812,075, filed Mar. 6, 1997, entitled "Enhanced Internet Domain Name Server," and is related to application Ser. No. 08/, 811,032, filed Mar. 6,1997, entitled "Internet Phone to PSTN Cellular/PCS System." Those applications are incorporated herein by reference in their entirety.

TECHNICAL FIELD

This invention relates to Internet telephony, and more specifically relates to establishing an Internet telephony connection to a called party who may be located at any one of a number of potential stations or who may be mobile.

Acronyms

The written description uses a large number of acronyms to refer to various services and system components. Although known, use of several of these acronyms is not strictly standardized in the art. For purposes of this discussion, acronyms therefore will be defined as follows:

Action Control Point (ACP)
Advanced Intelligent Network (AIN)
Advanced Services Platform (ASP)
Authentication Center (AC)
Base Station (BS)
Cellular Subscriber Station (CSS)
Common Channel Inter-office Signaling (CCIS)
Domain Name Server (DNS)
Dual Tone Multifrequency (DTMF)
Data and Reporting System (D&RS)
Equipment Identity Register (EIR)
Home Location Register (HLR)
Integrated Service Control Point (ISCP)
Intelligent Peripheral (IP)
Internet Protocol (IP)
Local Access and Transport Area (LATA)
Local Exchange Carrier (LEC)
Low-Power Self Contained Cell (LPSC)
Mobile Identification Number (MIN)
Mobility Controller (MC)
Mobile Switching Center (MSC)
Mobile Telephone Switching Office (MTSO)
Overhead Message Train (OMT)
Personal Base Station (PBS)
Personal Communication Service (PCS)
Plain Old Telephone Service (POTS)
Private Branch Exchange (PBX)
Private Automatic Branch Exchange (PABX)
Public Switched Telephone Network (PSTN)
Routing Control Record (RCR)
Service Control Point (SCP)
Service Management System (SMS)
Service Switching Point (SSP)
Signaling Transfer Point (STP)
Station Message Detail Recording (SMDR)
Service Creation Environment (SCE)
Telephone Company (TELCO)
Temporary Local Directory Number (TLDN)
Transaction Capabilities Applications Protocol (TCAP)
Transport Control Protocol (TCP)
Transport Control Protocol/Internet Protocol (TCP/IP)
Utilize Generic Data Interface (GDI)
Visitor Location Register (VLR)
Wireless Private Branch Exchange (WPBX)

BACKGROUND ART

Being readily available for telephone contact has become increasingly important for a growing number of people who have a significant need to be reachable regardless of their location. Many such persons have a telephone for business, a telephone for home, a mobile cellular telephone in the car, a transportable telephone for personal wear, as well as stations providing telephone service through computers. Business people and professionals at times have multiple offices and may additionally work at a home office. All of these telephones and computer stations generally have different telephone numbers and Internet addresses. This requires a caller to know or look up multiple numbers and addresses, and frequently to make multiple calls in order to reach a person.

While there are several telephone equipment features and telephone company services designed to ease the problem of multiple telephone numbers, they do not solve all such problems. For example, call forwarding provides call redirection from one telephone to another. However, once the subscriber activates call forwarding, he or she cannot answer the primary telephone until the feature is deactivated. Additionally, calls can only be forwarded to one telephone, so that the user must know where he or she is going to be in order to forward calls effectively. Without remote activation, subscribers must turn on call forwarding from their primary telephone.

A second attempt to solve this problem requires the addition of expensive customer premises equipment connected to the primary telephone and either a second telephone line or three-way calling. In this system, when a call comes in, the system sets up a three-way call to a pre-programmed telephone number, and either simultaneously alerts the attached telephone and the remote telephone or alerts the remote telephone after a predetermined number of rings. The system determines whether the attached telephone or the remote telephone answers first. If the attached telephone answers first, the system terminates the connection to the remote telephone. If the remote telephone answers first, the system bridges the incoming call to that telephone or, for three-way calling, simply drops off the connection. This system is limited in the number of other telephones that may be alerted, and involves installing and programming customer premises equipment that occupies space at or near the customer's telephone, and requires an additional line or coordination with three-way calling.

The complexity of the problem has recently increased in that a significant number of such persons now desire to be available not only via the public telephone network but also by Internet telephony through personal computer stations as well as public telephone network stations or terminals. While multicasting is known in the Internet the methodology generally relies upon routing protocols based on a distance-vector (sometimes also called path-vector) routing scheme such as that used in IDRP (Inter-Domain Routing Protocol):

Routing Information Protocol (RIP), as described by C. L. Hedrik in "Routing Information Protocol", RFC 1058 (Request for Comments), NIC (Network Information Center), June 1988.

Hello Routing Protocol, disclosed by D. L. Mills in "Experimental Multiple Path Routing Algorithm", RFC 981, NIC, March 1986.

Border Gateway Protocol (BGP), described by K. Lougheed and Y. Rekhter in "Border Gateway Protocol (BGP)", RFC 1163, NIC, June 1990.

Gateway-Gateway Protocol (GGP), as disclosed by R. M. Hinden and A. Sheltzer in "DARPA Internet Gateway", RFC 823, NIC, September 1982.

IP multicast algorithms have been developed primarily for use with the Routing Information Protocol as disclosed by C. L. Hedrik, cited above, but are usable with the other distance-vector routing algorithms as well. IP multicast algorithms (see, e.g., S. E. Deering and D. R. Cheriton, cited above; S. E. Deering: "Host Extensions for IP Multicasting", RFC 1112, NIC, August 1988; L. Hughes and P. Thomlinson: "A Multicast Internetwork Routing Algorithm". Proceedings of the IFIP WG 6.4 Conference on High Speed Networking, 18–22 March 1991, Berlin, pp. 183–200; D. Waltzman, C, Partridge, and S. E. Deering: "Distance Vector Multicast Protocol", RFC 1075, NIC, November 1988) are all variants of the Reverse Path Broadcasting algorithm described by Y. K. Dalai and R. M. Metcalfe in "Reverse Path Forwarding of Broadcast Packets", Communications of the ACM, Vol. 21, No. 12, pp. 1040–1048, ACM, December 1978. This algorithm is similar to the LAN multicast algorithm in that a spanning tree is used to distribute the multicast packets, however, it contains additional features to solve some of the problems associated with LAN multicasting. In brief, the algorithm works as follows (see S. E. Deering and D. R. Cheriton, cited above, for a more detailed description):

1. Multicast packets are initially broadcast to all subnetworks in the internetwork. Packets are broadcast on a least-cost spanning tree. When a router receives a multicast packet from some source "S", it knows that it is on the spanning tree for multicasts originating from S if its routing tables indicate that it can reach node S with a lower cost than all other routers attached to a given subnetwork (this information is available in the normal IP routing tables). If so, that router forwards the multicast packets on the subnetwork in question. It was shown by S. E. Deering and D. R. Cheriton, cited above, that this algorithm results in the multicast packet being distributed to each subnetwork in the internetwork with minimum cost.

An obvious improvement of this scheme compared to the LAN multicasting schemes is that while here the multicast spanning tree is fixed for a given source, it is not the same for all sources. Thus multicast traffic is distributed over many different paths in the network.

2. In order to avoid broadcasting multicast packets to subnetworks that do not have members in the specified group, a scheme is used whereby routers that receive a multicast for a particular group that do not lie on a branch of the multicast tree that leads to any members of that group discard the multicast (there is obviously no need to forward it) and report to the predecessor in the multicast tree that this branch of the tree may be pruned. This process begins with routers attached to "leaf subnetworks" (subnetworks that are at the end of their respective branches of the tree), and works its way up the branch as far as possible to restrict the distribution of multicast traffic to where it is required.

The IP multicast schemes have the following drawbacks:

Initially, multicasts from a given source to a given group must be broadcast to the entire internet until the multicast tree for that source-destination pair is pruned.

The scheme requires that information used for pruning the multicast trees be discarded after some time so that new members that join the network on a previously pruned tree branch will eventually start receiving the multicasts. Thus, multicasts trees are continuously rebuilt and repruned, creating considerable overhead on the network links and processing nodes.

Multicast trees exist for each source-multicast group pair. That is, a separate logical multicast tree exists for each different source that multicasts to a given group. Jelco routing nodes may have to maintain an extremely large database for pruned multicast trees.

For these reasons such protocols or algorithms seem unsuitable for use in the MPTN and similar architectures. A useful algorithm should be able to utilize the routing capabilities of gateways which have no multicast intelligence.

In general the above-described multicasting systems for use in the Internet are designed to deliver a specific message to a predetermined and specified number of destinations. The methodologies and systems employed do not lend themselves to economic and efficient use for solving the problem of establishing connection with one called party who may or may not be located at any one of a number of specified destinations or who may be mobile.

BACKGROUND PATENT LITERATURE

In the telephone network environment U.S. Pat. No. 5,506,887, issued Apr. 9, 1996, to Mark J. Emery, et al. entitled "Personal Communications Service Using Wireline/Wireless Integration," describes a personal communications service which allows a user to send and receive calls from a single portable handset using a single assigned number whether at home or roaming. The system and method described provides a mechanism for interfacing the capabilities of a land line telephone system with a radio link communication system, using a land line Advanced Intelligent Network (AIN).

The methodology provides centralized control of call processing by both telephone central office switching systems and wireless mobility controllers based on call processing data associated with individual subscribers stored in a central service control point, or data base, within the telephone network. This centralized call processing control can provide call routing to either a land line or a wireless unit via a mobility controller, in response to calls directed to a single number. The system can also extend special services normally provided to land lines by the telephone central office switches to any line of the system designated by subscriber registration and to mobile units operating in the wireless portion of the network. Thus, the system allows the individual user to control the delivery of telecommunications services to meet their personal life style and to virtually any geographic location, covered by the network, to which the user roams.

The integrated wired and wireless communication network includes communication lines and a central office switching system connected to communication lines selectively providing switched communication connections between the communication lines. A mobility controller selectively provides wireless communications to and from mobile communication units. Communication trunks interconnect the central office switching system and the mobility controller, and the mobility controller selectively provides switched communications between the communication trunks and wireless mobile communication units. A network controller, separate from the central office switching system and the mobility controller, stores call processing data for subscribers who are associated with one of the communication lines connected to the central office switching system and for subscribers associated with one of the mobile communication units. Call processing by both the central office switching system and the mobility controller to establish a completed communication link is controlled in response to the stored call processing data associated with at least one of the subscribers.

In one aspect, this arrangement provides a method by which the integrated system recognizes calls directed to an assigned subscriber number and accesses data stored in the central network controller to determine a line to a switching system or a mobility controller at which the subscriber last registered.

The programmability of the subscriber's service data within the network controller allows the subscriber to design call screening procedures to selectively route certain calls to other termination points, such as a voice mailbox. As another example, the system could provide a voice prompt asking certain callers if they are willing to pay for toll charges through long distance lines or for air time through the wireless part of the network. The system would complete the call only if the caller dialed in digits indicating assent to such charges and would add the charges to the caller's bill. The system also allows a subscriber to specify points to route calls to if the line and/or mobile communication unit are busy, for example to a different station such as might be assigned to a secretary. The arrangement also provides several systems for adding or modifying subscriber data stored in the central network controller's data base.

The system also includes method and apparatus for conducting registration procedures to inform the central network controller where the subscriber currently is located. A wireless base unit connected to a telephone line registers with the mobile communication unit when the mobile unit comes within range, and the base unit automatically dials and informs the central network controller of the registration. Similarly, when the portable unit first registers with a mobility controller, the mobility controller informs the network controller of the new registration.

When the system includes two central service controllers, often referred to as ISCPs, the methodology provides special procedures for exchange of data between the central controllers so that switching systems and mobility controllers communicate only with the central controller in their area. This prevents transmission of call processing instructions from a remote service controller to a switching system or mobility controller which might cause errant operation. Preferably the system designates the central controller or ISCP in the subscriber's home region as the source of that subscriber's Home Location Register (HLR) data. Also, each of the central controllers is set up to include Visiting Location Register (VLR) capability. When a subscriber traveling in a region other than his home region registers with a central controller outside her home region, through either a telephone registration procedure or a mobility controller registration procedure, that central controller establishes a VLR for that visiting subscriber. When switching systems or mobility controllers in the visited area need data regarding the visiting subscriber, they access the VLR in the central controller within that area.

Wireline network approaches to the problem include the following:

U.S. Pat. Nos. 4,611,094 and 4,611,096 both to Asmuth et al. disclose a system for providing custom incoming telephone call processing services to a corporate customer operating at geographically dispersed locations through a plurality of local office switches. A customer program stored in a central data base is accessed to provide instructions to the switches to complete incoming calls to customer locations in accord with special services defined by the corporate customer. Incoming calls to the customer are routed to an Action Control Point (ACP) which typically is a modified toll office. The ACP has a number of "primitive" call processing capabilities, such as providing voice prompts to callers and receiving additional caller inputs. The customer program controls the ACP's to string together the desired primitive call processing capabilities to process each call to the customer. Specified parameters stored in the program, such as time of day, caller location and data inputs responsive to the voice prompts, determine the final customer station to which each call should be completed. The customized call processing disclosed by Asmuth et al. can also include customized billing for calls, e.g., by splitting charges between the customer and the caller. The Asmuth et al. system sets up a billing record for each call in the ACP or toll office. Asmuth et al. also teach procedures for handling of calls directed to a corporate customer when the call serving office does not have all of the capabilities needed for processing the call in accordance with the customer's stored program. In particular, upon recognition of the deficiencies of the call serving office, the Asmuth et al. system transfers call processing to a second office having adequate capabilities for completion of the call.

U.S. Pat. No. 4,788,718 issued Nov. 29, 1988, to Sandra D. McNabb et al. suggests centralized recording of call traffic information. The architecture is similar to that disclosed by the earlier discussed patents to Weber and Asmuth et al. to the extent that local and toll offices communicate with a central data base via CCIS link. The McNabb et al. system improves over the incoming call routing provided by the Weber patent and the two Asmuth et al. patents discussed above by adding a data gathering function to the centralized data base which stores the individual customer's call routing program. In McNabb et al. the central data processor provides call attempt records and a traffic data summary of all calls directed to a particular 800 number.

U.S. Pat. No. 4,313,035 issued Jan. 26, 1982, to David S. Jordan et al. patent discloses a method of providing a person locator service through multiple exchanges of the switched telephone network. Each subscriber is assigned a personal number uniquely identifying the subscriber. An absent subscriber inputs a number to which calls are to be completed, such as the number where the subscriber can be reached, into a central data base. A caller wishing to reach the subscriber dials the number uniquely identifying that subscriber. In response to an incoming call directed to the unique number, a telephone switching office having access to CCIS sends the dialed number to the central data base referred to by Jordan et al. as an SSP. The data base retrieves the stored completion number for the called subscriber and forwards that number back to the switching office to complete the call. The subscriber can update the stored data from any telephone. Also, the subscriber can specify whether to charge calls via the person locator system to the subscriber or to the caller.

U.S. Pat. No. 4,899,373 issued Feb. 6, 1990, to Chinmei Lee et al. discloses a system for providing special telephone services to a customer on a personal basis, when the customer is away form his or her home base or office. A nationally accessible data base system stores feature data in association with personal identification numbers. A subscriber wishing to use personalized features while away from home base dials a special code from a station connected to any exchange which has access to the data base and presents the personal identification number. The corresponding feature data is retrieved from the data base and stored in the exchange in association with the station from which the request was initiated. The exchange then provides telephone service corresponding to the subscriber's personalized telephone features. A temporary office arrangement may be established in which the personalized features will be immediately available on incoming and outgoing calls for a period of time specified by the subscriber.

U.S. Pat. No. 5,475,748, issued Dec. 12, 1995, to Scott A. Jones, entitled "Automatic Telephone System With Function for Multiple Out-Dialed Calls Per Caller," describes an automated call processing system for telephone networks and more particularly an automated call processing system for locating a called party. The system utilizes either sequential or simultaneous outdialing. In the simultaneous method an incoming caller indicates special handling desired to reach a called party. A plurality of outdialing operations is then performed in sequence, terminating each unsuccessful outdialing operation when the called party is unavailable at the corresponding number. When the called party is contacted by a successful outdialing operation the incoming caller is connected to the called party. In the simultaneous method the outdialing operations are initiated simultaneously. In the sequential process the caller is informed of the progress of outdialing operations and is notified when each outdialing fails. The caller is given an opportunity to continue with the next set or substitute a different number for dialing, leaving a message on voice mail, sending a facsimile or E-mail, etc.

U.S. Pat. No. 5,260,986, issued Nov. 9, 1993, to Barry Pershan, entitled "Group Notification Service and System," and assigned to the assignee of the instant application, describes a group notification service and system integrated into a public switched telecommunications network. The system utilizes existing equipment to inform specific persons of issues or events by calling and delivering a customized message via the telecommunications network. Pagers may be simultaneously or sequentially called requested that the desired person call in for their message.

U.S. Pat. No. 5,206,901, issued Apr. 27, 1993, to John B. Harlow et al. entitled "Method and Apparatus for Alerting Multiple Telephones for an Incoming Call," describes a system for alerting a plurality of telephones in response to an incoming call to a destination directory number. A handling switch sends a query to a centralized database requesting routing instructions, and the database returns the directory numbers of the plurality of telephones to be alerted for incoming calls to the destination directory number. The busy/idle status of all of the plurality of telephones is checked, and an alerting signal is sent to all idle telephones. The handling switch is notified as to which alerted telephone has an off-hook appearance first, and the incoming call is routed to that telephone.

U.S. Pat. No. 5,361,256, issued Nov. 1, 1994, to Doeringer et al. entitled "Inter-Domain Multicast Routing," describes a method and system for multicasting messages in a complex computer network that is originally equipped only for Unicast transmission. The method and system multicasts a message from a sending station to a plurality of receiving stations within a conventional unicast message transmission network using existing protocols by, at least in certain nodes within the network, maintaining tables of subnetworks with multicast receiving stations or tables of multicast receiving stations and by including appropriate routing information in the header of multicast messages, as further defined in the claims.

It is stated that this system, when used in combination with distance-vector routing protocols such as the standard OSI IDRP routing protocol, disclosed in ISO "Information Technology-Telecommunications and Information Exchange between Systems-Intermediate System to Intermediate System Intra-Domain Routing Protocol for Use in Conjunction with the Protocol for Providing the Connection", ISO/DIS 10589, 1990, or any other similar protocol, such as those used in IP networks referenced above, supports multicasting in large internetworks. This solution is also stated to be usable with link-state routing protocols, such as OSPF developed for IP networks (described by J. Moy in "OSPF Version 2", RFC 1247, NIC, July 1991) and the OSI IS-IS protocol (described in ISO/DIS 10589, cited above) and are thus applicable to a wide range of internetworking environments. Within the invention, three new types of protocols are presented:

1. for the distribution of routing information based on network topology and the location of multicast group members, and for the creation of routing tables using this information;
2. for efficiently forwarding multicast packets to all members of a multicast group given the routing information front tile first step; and
3. for enabling the multicast protocols to be used in the MPTN environment.

DISCLOSURE OF THE INVENTION

Objectives

It is one objective of the invention is to provide an Internet communication service which is effective to implement automatic location of called parties at multiple locations.

It is another objective of the invention to provide such a service wherein a person initiating an attempt to establish communication with another party may establish such a link which does not necessarily require use of the public telephone network at the calling and/or called terminuses of the communication link.

It is a further objective of the present invention to provide a service of the above stated type permitting telephony type communication.

It is yet another embodiment of the invention to provide automatic location of a party called using the Internet data network in combination with both land based communications lines and radio links in such a manner that the services appear seamless across boundaries of the land line network and the radio link network.

It is still a further objective of the invention to provide a two-way audio (e.g., voice) communication service via a public packet data network, such as the Internet, which permits the automatic location of called users while permitting users to roam freely.

It is another objective of the present invention to accomplish the foregoing using an enhanced domain name server capable of using a single Domain Name address at an Internet telephone to communicate with another Internet telephone or telephones on the PSTN, both wireline and wireless.

It is still a further objective of the invention to provide a convenient and efficient system and method for a subscribing party to provision such an Internet telephone voice communication system with instructions, addresses and telephone numbers from any telephone in communication with the system.

It is yet another objective of the invention to provide a system and method whereby such provisioning may be accomplished without significantly increasing the traffic on the CCIS network.

SUMMARY OF THE INVENTION

The present invention utilizes enhanced processing, responsive to name translation requests, to provide selective routing services through a public packet switched data network. The name processing can apply to any translation of a name into an address or group of addresses or routing information for a packet data network. Following name translation into a group of addresses the invention provides a system and method for automatically establishing communication between a calling terminal and a terminal designated by one of the addresses at which the sought party may be found. The preferred embodiments, discussed below, include domain name processing. As such, the selective routing can apply to any communications via the network that rely on domain name addressing, such as E-mail and web page access through the Internet. However, the selective routing is particularly advantageous for processing of voice telephone communications through the packet data network based on domain name translations. It is a particular feature of the invention that one or more domain names can be translated into a group of addresses which may include a mixture of Internet (IP) addresses and telephone number addresses, along with routing procedures with respect to the addresses.

The system of the invention is arranged for effective and efficient provisioning by providing a peripheral platform offering one or more auxiliary call processing features. This platform is connected to one or more switching systems and is in data communication with the service control point database. The platform is preferably an Intelligent Peripheral (IP) offering a wide array of enhanced auxiliary service features.

The services control point is essentially a central control for the network. In a preferred embodiment of the network, incorporating the peripheral platform, a first signaling communication system for two-way communications of data messages ,namely the CCIS network, interconnects a number of central office switching systems and connects the central office switching systems to the services control point. A second signaling communication system provides two-way data signaling communications between the peripheral platform and the services control point. The second signaling communication system is separate from the first signaling communication system, the central office switching systems, and the trunk circuits interconnecting the central office switching systems. The second signaling communication system also permits exchange of messages between the peripheral platforms. The network may include a plurality of the peripheral platforms. One platform may connect to one switching system or to a number of the switching systems. Each such platform provides one or more auxiliary call processing capabilities in response to instructions from the services control point.

The combination of a plurality of peripheral platforms and a separate second signaling network permits exchange of messages between platforms, without the need to establish a call connection between the platforms through the switching systems and without adding excessive message traffic to the existing CCIS network carrying information between the central office switching systems and between the central office switching systems and the services control point. Another aspect of the invention relates to precise methods for routing calls to the peripheral platform for service. The signal control point or ISCP in which it is incorporated may signal the switching system to route the call to the peripheral platform and substantially simultaneously signal the peripheral platform over the second signaling network transmitting information and instructions as to handling of the call.

Two specific architectures for the IP version of the peripheral platform are disclosed. One version uses general purpose computers with appropriate line interfaces. The software run by the computers offers a variety of different enhanced service features, such as voice mail, facsimile mail, voice recognition, etc. The second version includes a number of separate modules for specific identified service features, e.g., a voice mail server, a facsimile mail server, etc.

The ability of the IP to play announcements and collect input information, as either dialed digits (e.g., DTMF inputs) or speech, also provides an automated service platform for input of new service information or modified service information, directly from subscribers. For example, when a subscriber calls in to change service information, the SSP and ISCP route the call to the IP, and the IP executes a script to obtain the change information. After all necessary service change information has been received, the IP would forward the information to the DNS and/or possibly to the ISCP and disconnect the call. In this manner automated provisioning of the Internet called party locator may be effected.

BEST MODE FOR CARRYING OUT THE INVENTION

Figure 1:
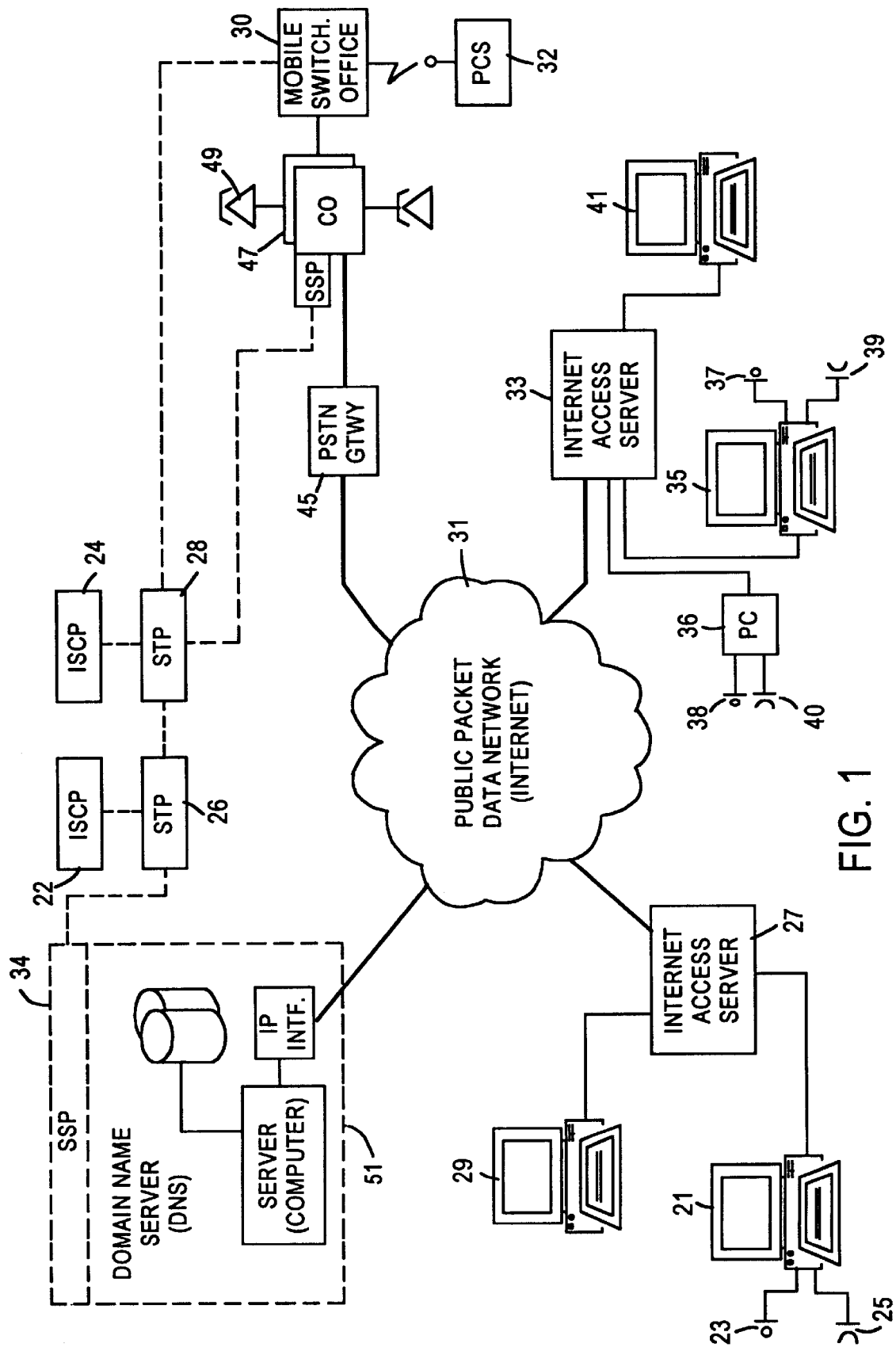
FIG. 1 is a simplified diagram of an Internet system with both data and telephone communication capabilities including enhanced domain name processing in accord with the present invention.
Figure 5:
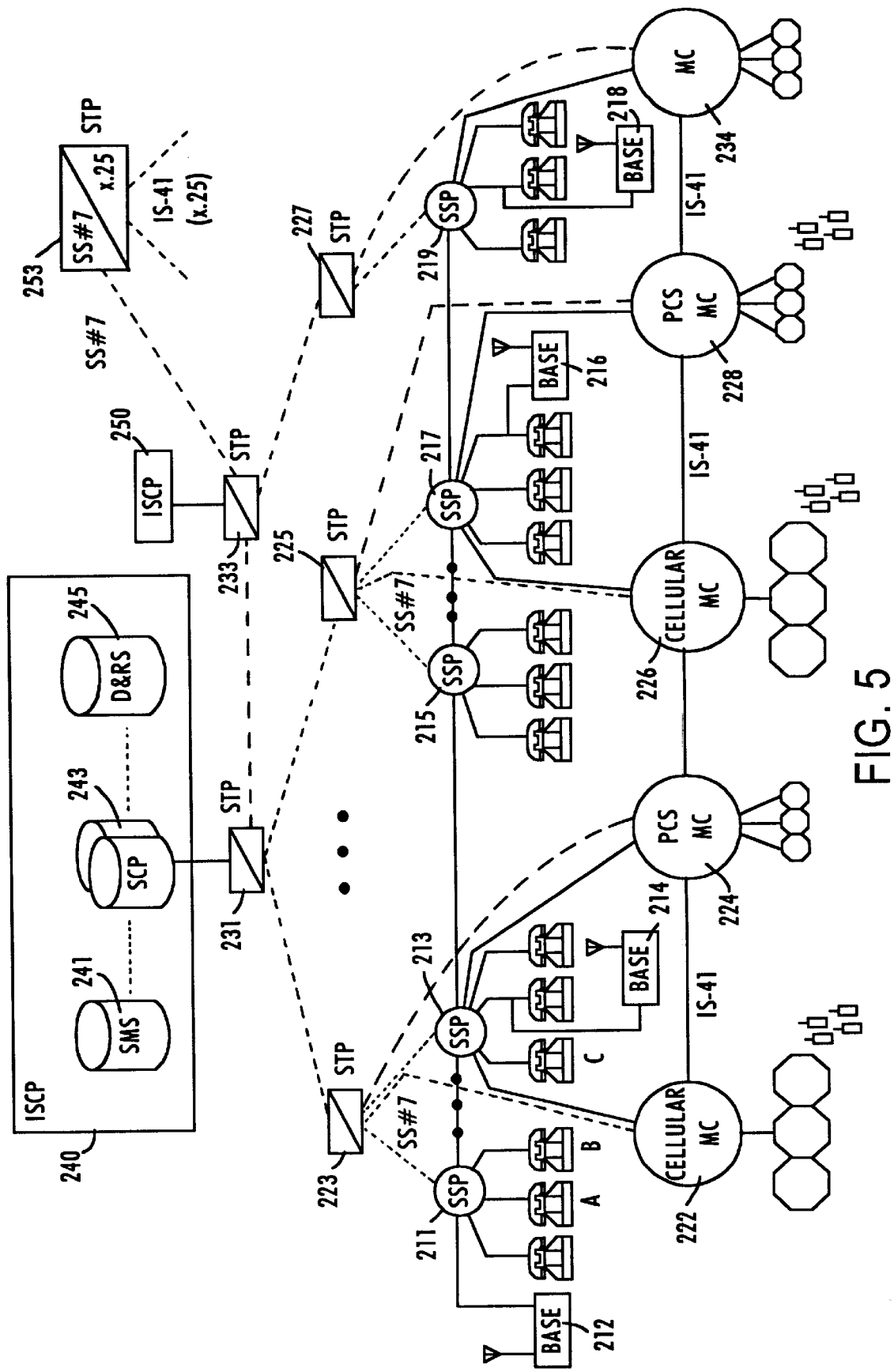
FIG. 5 is a more specific block diagram of one embodiment of an integrated land line and wireless communication system which may be used in the present invention.

FIG. 1 depicts a public packet data network 31 as a cloud. The network utilizes Internet Protocol (IP) based packet switching to route data packets between source and destination nodes coupled to the network. In the preferred embodiment, the public packet data network 31 is a wide area data network formed of a number of interlinked networks, such as the international network now commonly referred to as the "Internet". The preferred network 31 comprises a network of interconnected routers and networks, such as shown in FIG. 5 of the assignee's parent application Ser. No. 08/812,075, filed Mar. 6, 1997, referenced above as a related application.

A variety of computers and servers (not shown for simplicity) connect to the network 31, for example for providing web site services. Terminal devices communicate with the computers and servers as well as with each other. For simplicity, FIG. 1 shows for personal computer (PC) type terminal devices 21, 29, 35, 36, and 41.

Each of the PCs connect to the network 31 through an Internet access server 27 or 33. The servers 27 or 33 aggregate traffic to and from the associated terminal devices for transport over a relatively high-speed link to the packet switched data network 31. The Internet access server 27 or 33 provides a compatible interface to the respective PCs (modem, ISDN or LAN) and protocol conversion and interfacing, as necessary, for two-way data communication over the particular high speed link to the packet data Internet.

For example, the server 27 may comprise a modem bank coupled to the public switched telephone network (not shown) and coupled through a high speed link to ,an IP router within the network 31. In such an implementation, the PCs 21 and 29 would have analog modems for dial-up communications with the server 27. For communications with the PCs 21, 29, the server would provide point to point protocol (PPP).

As another example, the Internet access server 33 might communicate over a 10baseT Ethernet LAN with the PCs 35, 41. In this example, the PCs 35, 36, and 41 would include Ethernet LAN type interface cards and would connect through appropriate wiring to the Internet access server 33. The server 33 would provide two-way protocol conversions, as necessary for IP communications over the network 31 and would connect via a high speed link to an IP router within the network 31. The server 33 might also provide gateway and firewall functions, to control outside access to the LAN and controlled access from the PCs 35, 41 on the LAN to the public network 31.

The various PCs include processors, memories, various disc drives, etc. Each of the PCs also includes a display or monitor, a keyboard, and possibly one or more additional user input devices (not shown) such as a mouse, joystick or track ball. Typically, the software running on the PCs includes an operating system, such as Windows 95 and a series of compatible applications programs running under the operating system. The software implements a graphical user interface, including a user interface for communications through the public packet data network 31.

Many of the PCs also have voice communication capabilities. For example, PCs 21, 35, and 36 include microphones 23, 37, and 38 and speakers 25, 39, and 40. These PCs also include analog to digital and digital to analog converters, and the CPUs in such PCs run software for compression and decompression of digitized audio (typically voice) information. The software also processes the audio information for transmission and reception of the compressed digital information in IP packets and using the appropriate protocol for communication with the respective access server.

PCs having voice communication capabilities can conduct two-way, real-time audio communications with each other, in a manner directly analogous to a two-way telephone conversation. However, the actual signals exchanged between two such terminal devices go through the public packet data network 31 and the appropriate access servers 27 and 33. Typically, such communications at least bypass long distance interexchange carriers. In the example given above, the PC 21 connects to the Internet access server 27 through a dial-up telephone connection through a local carrier telephone network (not shown). The PCs 35 and 36 connect to the Internet access server 33 via a LAN. Voice communications between the PC 21 and either of the PCs 35 and 36 would utilize a local telephone link (between PC 21 and server 27), but the rest of the communication link would go through the public packet data network 31 and the LAN. If all three PCs connect to the Internet via a LAN or other data network, the audio communications may not utilize the telephone network.

Those PCs which have voice communication capabilities may also send and receive telephone calls via the public switched telephone network to persons using standard telephones 49. For this purpose, the public packet data network 31 connects to a number of PSTN gateways in different service areas, although only one such gateway 45 appears in FIG. 1. Each gateway 45 connects to one or more central offices 47 of the public switched telephone network in the region where the gateway 45 is located. Calls through such gateways typically bypass the long distance interexchange carrier and may utilize a data network connection to one PC, as in the earlier example.

The PSTN gateway 45 provides a voice telephone grade interface to the public packet data network 31, for a large number of calls, between telephone networks such as the PSTN and/or cellular or PCS type mobile telephone networks such as indicated at 30 and 32. Typically, such a gateway 45 will connect to at least one central office (CO) 47 of the PSTN via one or more primary rate interface type ISDN line groups or a combination of one or more T1 circuits and a Simplified Message Desk Interface type signaling circuit. The line circuits provide digital line interconnections of the gateway 45 to the central office 47.

The PSTN gateway 45 includes one or more computers for processing individual calls. The computer(s) include appropriate line interfaces for answering incoming calls and initiating outgoing calls over the particular type of line circuits. The interfaces also receive and decode standard signaling messages from the PSTN, e.g., DTMF dialing signals, and detect line status and call progress signals on incoming and outgoing calls. Each of the computer(s) in the gateway 45 runs software to compress incoming audio signals from the PSTN in a standardized format and decompress digital audio signals in that format received via the public packet data network 31, for transmission over the PSTN. The computer(s) also perform the two-way protocol processing to send and receive compressed, digitized voice data in TCP/IP packet form over the network 31. The PSTN gateway 45 includes or connects to a router coupled to the public packet data network 31. Copending commonly assigned application Ser. No. 08/634,534 filed Apr. 18, 1996 describes several implementations of "Internet Modules" which may serve as alternate embodiments of the PSTN gateway 45.

Communications via the public packet data network 31, such as the Internet, utilize IP protocol addressing. As discussed in the assignee's parent application Ser. No. 08/812,075, attorney number 680-197, referenced above, and as known to those skilled in the art, each such address comprises a series of four numbers separated by dots. To facilitate person to person communications, however, people can address each other using easier to remember names. In the presently preferred embodiments, these names may be textual domain names or telephone number based domain names, but other name formats are within the scope of the invention. A domain name server system 51 translates the names into actual IP addresses. In accord with a preferred embodiment of the present invention, the translation may also provide other related information such as one or more domain names, and one or more additional or alternate telephone numbers.

As shown in simplified form in FIG. 1, the domain name server (DNS) 51 comprises a server computer which functions as the central processing unit of the domain name server. The computer has an IP packet data interface to the network 31. The DNS system 51 also includes a data storage system storing a series of databases attached to or incorporated into the server. As discussed more below, the databases include look-up tables for direct translations of names to addresses and routing control records for conditional as well as parallel processing of requests for communication with at least some customers.

Essentially, when a person wishes to initiate a communication, they instruct their PC to start communication using a name address. The PC transmits a name translation request or "query" to the domain name server system 51 via the appropriate access server and the network 31. The server 51 receives the a domain name query from the public packet data network 31. In response, the server may execute a direct look-up table based translation to an IP address or telephone number. However, for any called party customer who has established a more sophisticated routing service, the server 51 will execute conditional analysis, locate multiple addresses, and initiate routing in response to the domain name translation query.

In its simplest form, if the conditional analysis produces a first result, the server 51 translates a name included in the query (e.g., domain name or telephone number based name) into a first destination IP address. If the conditional analysis produces a second result, the server 51 translates the name included in the query into a second destination IP address. The server then transmits a response message containing the first or the second destination address to a calling PC. The PC uses the received IP address to establish the desired communication through the public packet data network 31.

The name processing may apply to data communications as well as to voice telephone type communications through the packet data network 31. Also, the conditional analysis name processing may utilize a variety of criteria relating to the communication, such as the identity of the calling party or terminal, the time, the status of a primary destination terminal, etc. The conditional processing by the domain name server 51 will support a wide array of selective routing services, such as routing to different destinations at different times, routing to an alternate destination if a primary destination is inactive, follow-me type service, etc. Several more specific routing examples will be discussed in detail later.

Figure 2:
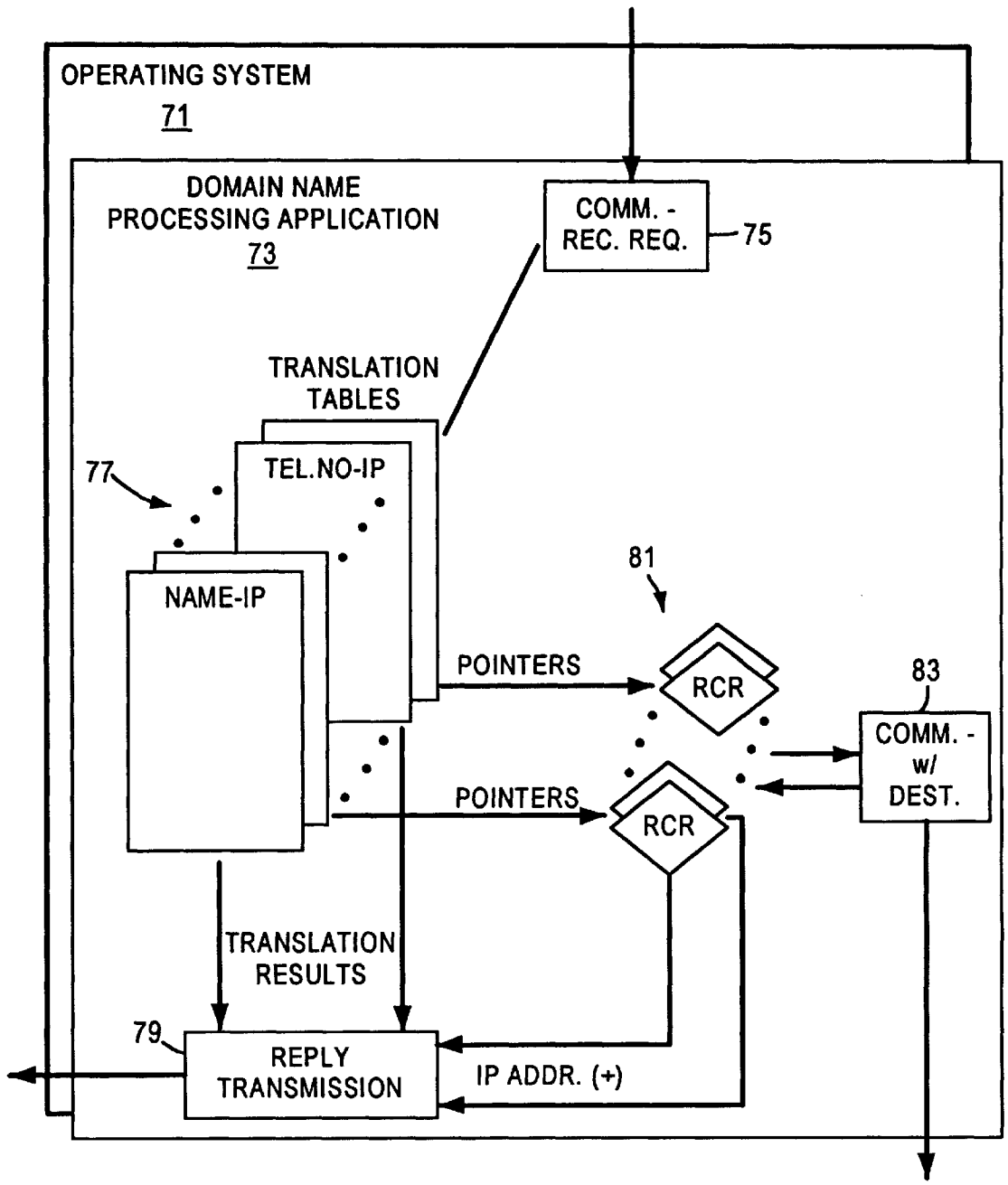
FIG. 2 is a simplified functional illustration of certain software elements of a domain name server system, useful in explaining the enhanced name processing used in the present invention.

FIG. 2 provides a simplified illustration of an example of one possible organization of the software for the domain name server 51, for implementing the enhanced operations in accord with the present invention. The computer of the domain name server runs a standard operating system 71, such as UNIX. The operating system facilitates execution of one or more applications. One of the applications that will run on the computer of the domain name server 51 is a domain name processing application 73. The domain name processing application 73 includes executable code facilitating the actual processing. The executable code permits access to translation tables 77 and routing control records (RCRs) 81 stored in a database within the storage system portion of the domain name server 51. The executable code of application 73 also triggers several communication routines 75, 79 and 83.

More specifically, when the computer of the domain name server 51 receives a "query" or request for name translation, the operating system 71 passes the request from the IP interface to the communication routine 75 of the application 73. The communication routine extracts the appropriate information from the query message, such as the address of the requesting terminal device and the name that the terminal device has identified for translation.

The domain name processing application 73 can access a number of translation tables. Some of the tables will translate domain names into IP addresses. A name requiring access to this type of table is "eric.voit@phone". Other tables will translate telephone numbers or names incorporating telephone numbers into IP addresses. A number based name requiring access to this type of table is "301-608-2908@phone". The domain name processing application 73 examines the name information supplied by the communication routine 75 to identify the appropriate translation table and uses the name to access the translation entry corresponding to the name.

Certain translations of domain names will result in a response or reply message containing a destination telephone number. Other translations will involve conditional analysis processing for at least some called parties as described below. Such analysis may result in identification of a telephone number in response to a domain name translation request, depending on certain parameters relating to the particular query. However, the domain name server may translate names into telephone numbers in other ways. Although not shown, the translation tables may include one or more tables for translating domain names directly into telephone numbers.

Some name translations will result in a direct translation into an IP address, in a manner similar to existing procedures for translation of a textual domain name into an IP address. In such cases, the domain name processing application 73 will supply the IP address resulting from the translation from the appropriate table 77 to a communication routine 79 for transmission of a reply message to the terminal device that requested the translation. The application 73 also provides the address of that terminal device to the reply transmission routine 79. In response, the routine 79 will formulate an IP reply message containing the terminal device address as the destination address and containing the IP address produced by the translation process as message data. The reply transmission routine 79 forwards the message through operating system 71 and the IP interface for transmission through the public packet data network 31 to the requesting terminal device. The requesting terminal device then initiates the desired communication using the destination address.

Certain parties or customers will desire and subscribe to a variety of routing services requiring conditional analysis type processing. For each of those customers, the domain name server will store a routing control record (RCR) 81. For each name associated with such a customer, the translation tables 77 will store a pointer pointing to the routing control record (RCR) 81 that controls that customer's routing service.

The domain name processing application 73 will receive a query in the manner discussed above. However, when the application accesses the translation table with the name associated with a customer having conditional analysis based service, the translation will return a pointer identifying the controlling RCR. The domain name processing application 73 then executes a conditional analysis routine utilizing the identified RCR 81. The conditional analyses defined by the RCRs vary considerably, depending on the customized routing service selected by each customer. Several simple examples are described for convenience.

In the simplest form, the RCR specifies a set of conditions or criteria and two or more alternate destinations, depending on which criteria are satisfied by the current call or translation request query. For example, the RCR may specify alternate destination addresses for different times, or for different addresses of the terminal that requested the translation. In these cases, the domain name processing application 73 compares call or query related parameters to the criteria in the RCR 81 and obtains the destination address corresponding to the parameters of the current call or translation query. Here, the address may be an IP address, other routing information (e.g., telephone number) or a combination of the IP address plus some other routing information.

The domain name processing application 73 will supply the result from the RCR processing (IP address and/or other routing information) to the communication routine 79. The transmission reply routine transmits a reply message to the terminal device that requested the translation, in the manner discussed above. However, in this case, the reply message contains the IP address and/or other routing information obtained from the RCR processing. The requesting terminal device initiates the desired communication in the normal manner but using the address information obtained as a result of the conditional analysis. In this manner, the communication ultimately goes to the destination selected by the called party who established the customized routing service and the corresponding RCR in the domain name server 51.

Some of the customers will desire still more complicated conditional analysis processing, and for those customers the RCRs 81 will cause the domain name processing application 73 to call other routines. Consider one example. A customer has elected a routing service that depends in part on an analysis of the status of the customer's primary terminal, e.g., whether or not that terminal device is on. In such a case, the customer's RCR would point to a communication routine 83. The routine 83 would transmit a query through the public packet data network 51 to the customer's primary terminal asking if that terminal is "live". If the terminal responds, then the RCR causes the domain name processing application to output the address of the primary terminal to the reply transmission routine 79, for transmission to the requesting terminal device. If the primary terminal device does not respond within a set time period (e.g., because it is off), then the RCR will supply an address and/or other routing information for an alternate destination. The domain name server 51 may query the alternate destination in a similar manner, or the application 73 may supply the information regarding the alternate destination to the reply transmission routine 79, for transmission to the requesting terminal device, depending on the customer's RCR.

It may be helpful, at this point, to consider several examples of specific communications through the public packet data network utilizing the enhanced domain name server and translation processing in accord with the procedures implemented by this arrangement.

In a first example, assume that a person at PC 29 wants to send a message to a person at PC 41, for example an E-mail message. Assume also that the person normally at PC 41 has elected a simple alternate routing service. If the person's terminal device, PC 41, is active or "live", then the person wants messages directed to that device 41. If the PC 41 is inactive, then the person wants message directed to an alternate terminal normally operated by someone who may be able to respond immediately during the customer's absence.

In this example, an operator sitting at her personal computer 29 enters the called person's domain name address, which is a textual address such as "eric.voit@phone" or a telephone number based name such as "301-608-2908@phone". Her personal computer 29 transmits a query containing the entered name through the Internet access server 27 and the public packet data network 31 to the domain name server 51.

Figure 3:
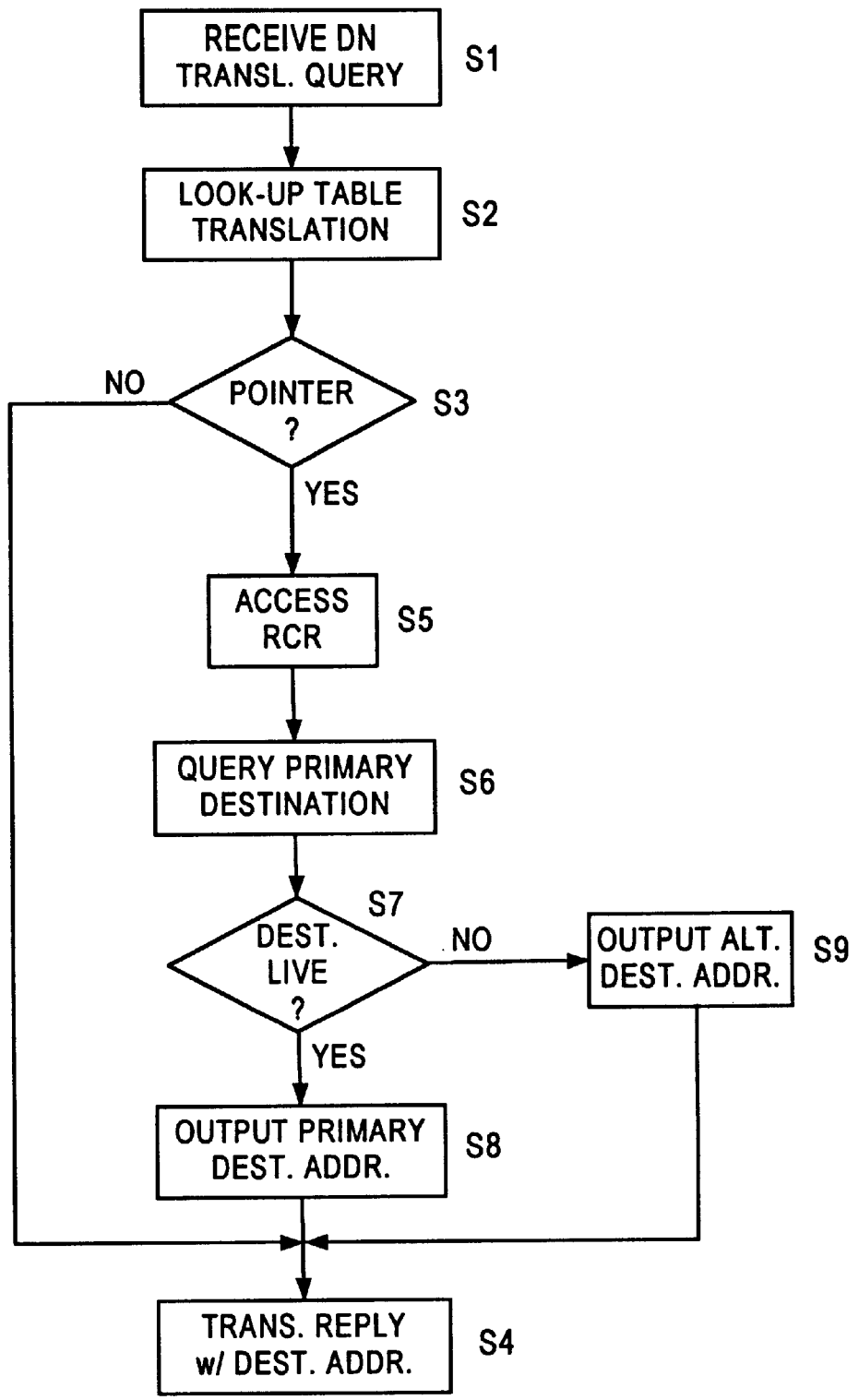
FIG. 3 is a simplified illustration of the processing flow by the domain name server in response to a query message.

FIG. 3 provides a simplified illustration of the processing flow by the domain name server in response to this query message. In step S1, the domain name server receives the query or request for translation. The server accesses the appropriate translation table and performs a translation (step S2). Processing branches at step S3. If there is no pointer, the translation produced an actual destination address. The domain name server therefore transmits a reply (step S4) containing the destination IP address, back to the calling party's PC 29. The PC 29 would use the received IP address to send the desired message.

However, in the current example, the called party has a conditional routing service. The translation in step S2 therefore retrieves a pointer and step S3 branches processing to step S5 wherein the domain name server accesses the RCR identified by the pointer. From this point on, the domain name server processes the translation request based on the called party's RCR. In our present example, the RCR would cause the domain name server to transmit a query message to the PC 41, the primary destination terminal device identified in the RCR (step S6).

Processing branches again at step S7, depending on whether or not the primary destination terminal is "live". The terminal device is "live" if it is active and accepting communication. In such a case, the PC 41 would respond with an affirmative message. The RCR therefore would cause the domain name processing to output the IP address of the primary destination terminal device, the PC 35 (step S8), for transmission in the reply message (step S4). In these circumstances, the PC 29 would use the received IP address to send the desired message to the PC 41.

At step S7, the domain name server may find that the primary destination terminal device, PC 41, is not "live" at this time. For example, the PC may not respond within a predetermined time limit. Alternatively, the PC may respond with a message indicating either that the called party is not accepting messages or does not want to accept a message from the present caller. When the primary destination terminal device is not "live", step S7 branches to step S9, and the domain name server outputs at least an IP address for an alternate destination. In the simplest case, the RCR identifies the one alternate destination, although a variety of more sophisticated processing methodologies can be used to identify the alternate destination. Assume here the simplest case in which the RCR simply identifies a single alternate destination, and in this example assume specifically that the RCR identifies the IP address of the PC 35 as the alternate address. The RCR therefore would cause the domain name processing to output the IP address of PC 35 in step S9, and the server would transmit the reply message containing that address in step S4. Under these conditions, the PC 29 would use the received IP address to send the desired message to the PC 35.

As shown by the above example, the domain name server processing produces different results in response to a query relating to a single customer's name based on different conditions or circumstances, in this case whether the primary destination terminal is "live" at the time of the request for translation.

The domain name server would process queries relating to voice communications through the network 31 in essentially the same manner, for example for a voice call from a person using PC 21 to a person whose primary destination terminal is the PC 35.

In this second example, an operator sitting at her personal computer 21 enters that person's domain name address, which is a textual address or a telephone number based name. Her personal computer 21 transmits a query containing the name through the Internet access server 27 and the public packet data network 31 to the domain name server 51. Again, the domain name server receives the query or request for translation (step S1). The server accesses the appropriate translation table and performs a translation (step S2), and processing branches at step S3. If there is no pointer, the translation produced an actual destination address. The domain name server therefore transmits a reply (step S4), containing the destination IP address, back to the calling party's PC 21; and that PC uses the received IP address to initiate the desired voice communications.

Assume now that the called party associated with PC 35 has a conditional routing service. The translation in step S2 therefore retrieves a pointer, and step S3 branches processing to step S5 wherein the domain name server accesses the RCR identified by the pointer. Assume in this example, that the first element of the conditional processing is a determination of whether the primary destination terminal device is "live". In a manner similar to the earlier example, the RCR would cause the domain name server to transmit a query message to the PC 35, the primary destination terminal device identified in the RCR (step S6).

If the primary destination terminal (PC 35) is "live," then processing branches from step S7 to step S8. The RCR causes the domain name processing to output the IP address of the primary destination terminal device, the PC 35, and the domain name server transmits that address in the reply message (step S4). The PC 21 uses the received IP address to initiate voice communications with the PC 35 through the public packet data network 31.

If the domain name server determines that the primary destination terminal (PC 35) is not "live," in one of the ways outlined above, then processing branches from step S7 to step S9. A variety of procedures could be used to select an alternate destination. For example, the customer might periodically provide a current telephone location for registration in the customer's RCR, so that voice calls would follow the customer where ever the customer might travel. Alternatively, a roaming subscriber with a laptop might obtain a new IP address each time that subscriber dials in to an Internet Service Provider from a different geographic location, and an access server operated by the Service Provider and/or the laptop would communicate with the domain name server 51 to update the address stored in association with that subscriber's domain name. An example of a "follow-me" type service is disclosed in more detail in the assignee's above-referenced parent application Ser. No. 08/811,032, filed Mar. 6, 1997, entitled "Internet Phone to PSTN Cellular/PCS System".

For simplicity, assume that the called party wants all incoming calls when PC 35 is not "live" routed to a telephone 49, for example a secretary's telephone. At step S9, the domain name server outputs information identifying the alternate destination. In the present example, the RCR identifies the IP address of the PSTN gateway 45 and the telephone number of the line to telephone 49, and this information is output for transmission to the PC 21 in step S4. The PC 21 uses the received information, e.g., the IP address and the telephone number, to establish voice communications with the alternate destination.

The PC 21 would initiate a signaling communication through the Internet access server 27 and the public packet data network 31 with the PSTN gateway 45, using the IP address received from the domain name server 51. As part of the signaling communication, the PC 21 would supply the telephone number to the PSTN gateway 45. The PSTN gateway 45 would initiate a voice telephone call to the telephone 49 through one or more COs 47 of the local public switched telephone network. If the line to telephone station 49 is busy, the CO(s) 47 return a busy signal. The gateway 45 detects this signal and transmits an appropriate message back to the PC 21 causing the PC to inform the caller of the "busy" condition. However, if a person answers the telephone 49, the PSTN gateway 45 initiates a voice communication session through the public packet data network 31 and the Internet access server 27 to the PC 21 and provides a communication link between that packet data network session and the call through the PSTN to telephone 49. After this session set-up, the user at PC 21 can talk to the answering party at telephone station 49, in a normal conversational manner.

The foregoing examples of operation of the enhanced domain name server are provided as a background to and aid in the understanding of the expanded the operation of the expanded hybrid combination of networks which serve as a platform for operation of the preferred mode of the present invention.

Reference is directed to FIG. 1 for a description of that expanded and integrated hybrid network. Referring to that figure, it will be seen that the illustration of the telephone network represented by the CO's 47 has been supplemented by a simplified showing of the added elements necessary to provide a Personal Communication Service or "PCS" of the type described in detail in commonly owned U.S. Pat. No. 5,506,887, issued Apr. 9, 1996, to Emery et al., entitled Personal Communications Service Using Wireline/Wireless Integration. That patent is incorporated herein by reference in its entirety.

Integrated service control points (ISCPs) 22 and 24 are shown connected by data links to service transfer points (STPs) 26 and 28. The CO 47 is assumed to have service switching point (SSP) capabilities and this is indicated by the SSP module linked to the STP 28. The STP 26 may be linked to the domain name server 51 via an interface 34.

In order to provide the desired wireline/wireless switching services the CO 47 is connected to a Mobile Switching Office 30 which provides wireless communication with an exemplary PCS or mobile phone or handset 32. The mobile switching office 30 is also connected by a data link to the AIN via the STP 28. The wireline/wireless integrated network is now described in further detail in connection with FIGS. 4 and 5.

Figure 4:
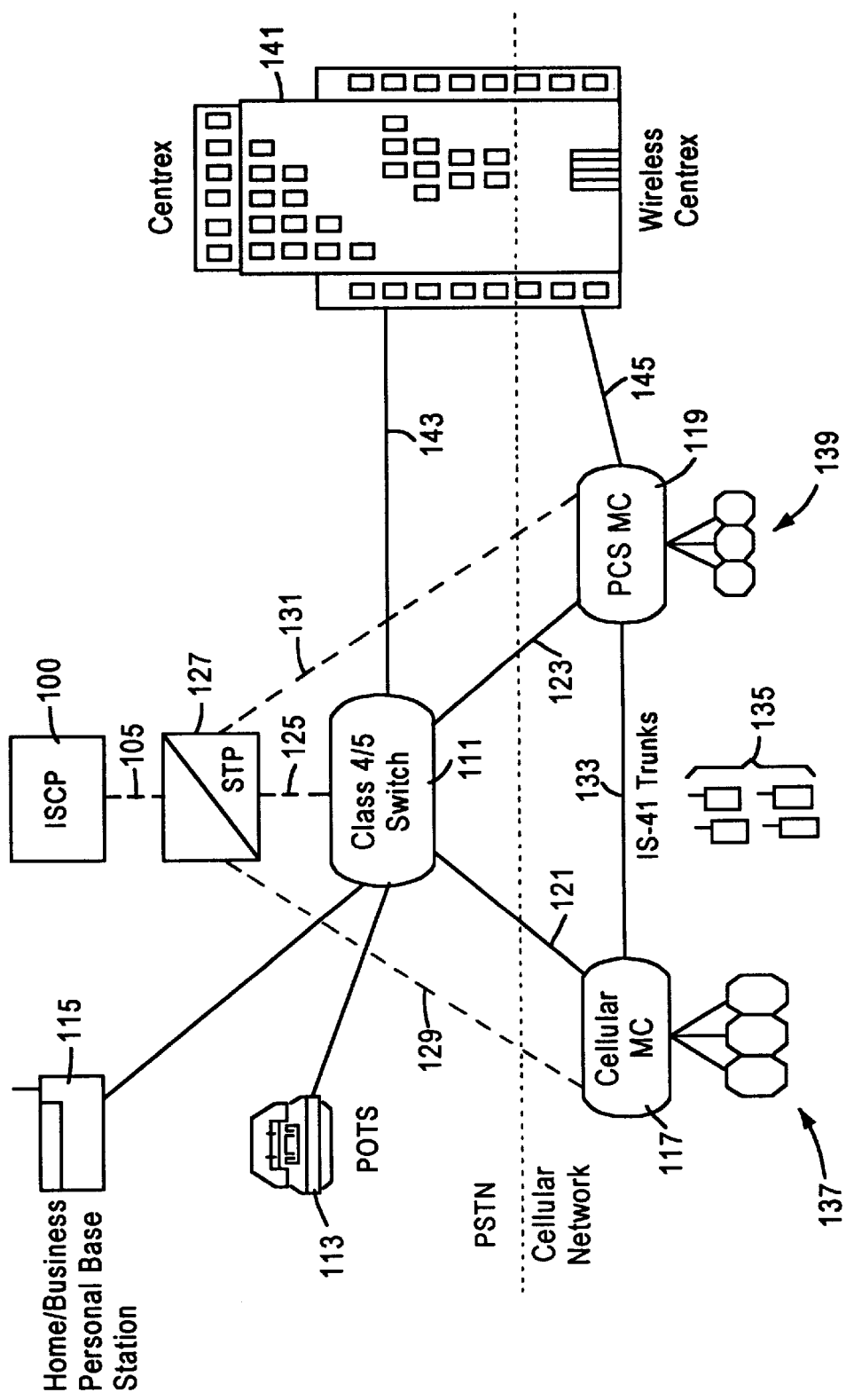
FIG. 4 provides a conceptualized illustration, in general block diagram form, of a communication system for implementing Personal Communication Service.

In the simplified example of FIG. 4, one or more central office switches, such as the class 4/5 Switch 111, are located throughout a state or region served by a TELCO providing the Personal Communication Service. Local telephone lines connect the central office switch 111 to individual telephone terminals in each geographic area, for example to the Plain Old Telephone Service (POTS) phone 113 and the base station 115 (described in detail below).

Although shown as telephones in FIGS. 4 and 5, the terminals can comprise any communication device compatible with the line. Where the line is a standard voice grade telephone line, for example, the terminals could include facsimile devices, modems, etc. Similarly, the portable handsets can incorporate both standard telephone communication components and other communication devices. In fact, the portable units may not be handsets at all. If desired, the portable unit may comprise any communication device compatible with the system, for example portable facsimile devices, laptop computers, etc.

The Switch 111 connects via trunk circuits 121, 123 to one or more Mobility Controllers (MCs), such as the Cellular MC 117 and the PCS MC 119. As described in more detail with reference to FIG. 5, each central office will also connect via trunk circuits to one or more remote central offices. The trunk circuits carry large numbers of telephone calls between central offices and/or between a central office and the mobility controllers. Also, each central office has a Common Channel Inter-office Signaling (CCIS) type data link 125 going to a Signaling Transfer Point or "STP" 127. CCIS type data links 129 and 131 provide data communication for PCS and related special service processing between the MCs 117, 119 and the STP 127. Also, a CCIS packet switched data link 105 connects the STP 127 to an Integrated Service Control Point (ISCP) 100.

Each MC connects to antennas for a number of cell sites to provide wireless communication services to PCS portable handsets 135 and/or other wireless mobile communication devices. In the example shown, Cellular MC 117 controls communications via a number of macrocells 137. PCS MC 119 controls communications via a number of microcells 139. The MCs 117,119 are also interconnected with each other by IS-41 data trunks 133, and may be interconnected via voice trunks (not separately shown) essentially running in parallel with the IS-41 trunks 133.

To provide land line type centrex services for a business customer, the switch 111 provides a land line connection 143 to the customer's premises 141. The land line link would actually include a number of telephone lines connected to various types of conventional telephone terminal devices. To provide wireless centrex services to a particular location, which may be the same customer premises 141, lines 145 connect the PCS MC 119 to macrocell antennae within the customer's building. Although shown as a single building, the integrated Centrex could cover a broader area, for example an entire college campus. The PCS system can integrate a customer's existing wireline-based Centrex or PBX services with a wireless version of those services. PCS will allow four digit dialing of the personal Centrex or PBX number, and it will recognize when the personal user is located within a unique wireless environment based upon registration information sent to it by the wireless Centrex/PBX provider for delivery of calls. Calls to the Centrex/PBX number will be automatically routed to wherever the personal user is, be it wired or wireless and on any connecting network.

FIG. 5 is a schematic block diagram of the components of AIN type integrated land line and wireless system, similar to the system of FIG. 4, but showing somewhat more detail. In this figure, each of the CO switches are labeled as an "SSP." These Service Switching Points, referred to as SSPs, are appropriately equipped programmable switches present in the telephone network, which recognize AIN type calls, launch queries to the ISCP and receive commands and data from the ISCP to further process the AIN calls. Such SSP capable COs are hereinafter sometimes referred to as SSP/COs or CO/SSPs.

SSPs can be programmed to recognize a number of different triggers as an indication that a call is an AIN call. For example, the trigger can relate to the identification of the telephone line from which a call or other request for service originates, and such a trigger is useful for activating certain services to be discussed later. At least initially, however, for incoming PCS type calls the trigger is based on a recognition that the terminating station identified by the destination number is a PCS subscriber.

As shown in FIG. 5, all of the COs 211, 213, 215, 217 and 219 are equipped and programmed to serve as SSPs. Such central office switching systems typically consist of the above discussed class 4/5 programmable digital switch with CCIS communications capabilities. One current example of such a switch is a 5ESS type switch manufactured by AT&T; but other vendors, such as Northern Telecom and Seimens, manufacture comparable digital switches which could serve as the SSPs.

A number of subscriber telephone lines connect to each of the SSPs which provide switched telephone communications services to subscriber terminals coupled to those telephone lines. Many of the TELCO's subscriber's will still have ordinary telephone terminals, as shown. Those who subscribe to PCS will have a home base unit, such as shown at 212, 214, 216 and 218. The base unit may be the only terminal device connected to a particular telephone line, as is base unit 212, or the base may connect to the line in parallel with one or more standard telephone station sets as does base unit 214.

To provide wireless mobile communications, the network further includes a number of Mobility Controllers or "MCs" which communicate with the SSPs, STPs and ISCP of the AIN type telephone network. As shown in the drawing, the network includes cellular MCs 222 and 226 and MCs 224 and 228 constructed specifically for PCS. Each of the MCs connects to an SSP type central office switch via a voice telephone trunk, shown in solid lines. MCs 222, 224, 226 and 228 each also connect to one of the STPs via an SS#7 link.

The system for implementing Personal Communication Service in one telephone company service area or perhaps one LATA includes a number of the SSP capable CO switches, such as the SSPs shown at 211, 213, 215, and 217. The SSP type central offices are each at a different location and distributed throughout the area or region served by the Personal Communication Service system. The PCS system of one regional TELCO will connect to networks serving other regions, for example the networks of other TELCOs. The switch 219 in FIG. 5 represents one of the SSP switches of a second TELCO implementing a PCS service.

The SSPs 211 and 213 connect to a first local area STP 23, and the SSPs 15 and 17 connect to a second local area STP 225. The connections to the STPs are for signaling purposes. As indicated by the black dots below STPs 223 and 225, each local area STP can connect to a large number of the SSPs. As shown by solid lines in FIG. 5, the central offices or SSPs are interconnected to each other by trunk circuits for carrying telephone services.

The local area STPs 223 and 225, and any number of other such local area STPs, shown as black dots between STPs 223 and 225, communicate with a state or regional STP 231. The state or regional STP 231 in turn provides communications with the TELCOs ISCP 240. The STP hierarchy can be expanded or contracted to as many levels as needed to serve any size area covered by the Personal Communication Service and to service any number of stations, central office switches, mobility controllers and mobile communication units.

The links between the SSPs and the local area STPs are CCIS links, typically SS7 type interoffice data communication channels. The local area STPs are in turn connected to each other and to the regional STP 231 via an SS#7 packet switched network. The regional STP 231 also communicates with the ISCPs 240 via a packet switched network communications.

The network of the second TELCO can have an architecture essentially similar to that described above. For example, as shown in FIG. 5, the SSP 219 connects to a first local area STP 227 via an SS7 link, and SSP 219 connects to one or more central offices or SSPs including SSP 217 by means of trunk circuits for carrying telephone services. The local area STP 227 communicates with a state or regional STP 233 of the second TELCO. The STP 233 provides CCIS type data communications with the second TELCO's ISCP 250 and with the SSPs and ISCPs of other TELCOs, for example by packet switched connection to STP 231. The link between the SSP 219 and the local area STP is a CCIS link, typically an SS#7 type interoffice data communication channel. The local area STP is connected to the regional STP 233 via a packet switched network also typically SS#7. The regional STP 233 also communicates with the ISCP 250 via a packet switched network. The second TELCO's network further includes a number of MCs such as MC 234, each of which will communicate with the SSPs, STPs and ISCP of the AIN type telephone network. Like the MCs of the first TELCO, MC 234 connects to an SSP 219 via a voice telephone trunk, shown as a solid line. MC 234 also connects to the local area STP 227 via an SS7 link.

The MCs are connected with each other via IS-41 protocol trunks for exchange of data relating to handoff and to exchange of data for extending services to visiting subscribers of distant cellular systems who are not subscribers to PCS. The IS-41 data trunks are actually a packet switched network, which may be either an X.25 network or an SS#7 network. To provide handoff during a wireless call in progress, the MCs are also interconnected via trunk circuits (not shown).

To allow data communication of HLR data registered in the ISCPs 240, 250, to visitor location registers in remote MCs, the network further includes a hub STP 253. The hub STP connects to an X.25 packet switched data network, which currently carries IS-41 data messages between existing MCs outside the PCS service area. The hub STP 253 couples IS-41 messages between the X.25 network and the SS7 network, shown by the dotted line data communication link to the regional STP 233. The communication through the hub STP 253 allows outside MCs to communicate with the ISCPs of both TELCOs providing the PCS type services as if the ISCPs 240, 250 were home location MCs for the PCS subscribers when PCS subscriber is visiting another service area.

The messages transmitted between the SSPs and the ISCPs are all formatted in accord with the Transaction Capabilities Applications Protocol (TCAP). The TCAP protocol provides standardized formats for various query and response messages. Each query and response includes data fields for a variety of different pieces of information relating to the current call. Of particular note here, an initial TCAP query from the SSP includes, among other data, a "Service Key" which is the calling party's address and digits representing the called party address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" responses for instructing the SSP to play an announcement or to play an announcement and collect digits.

As shown in FIG. 5, the ISCP 240 is an integrated system. Among other system components, the ISCP 240 includes a Service Management System (SMS) 241, a Data and Reporting System (DRS) 245 and the actual data base or Service Control Point (SCP) 243. The ISCP also typically includes a terminal subsystem referred to as a Service Creation Environment or SCE (not shown) for programming the data base in the SCP 243 for the services subscribed to by each individual business customer. Although not shown in detail, the ISCP 250 will typically have a similar integrated system structure. Alternatively, the second ISCP 250 may not be an "integrated" system. For example, the second unit 250 may include only a data base system similar to that of the Service Control Point (SCP) 243.

For standard telephone service, each central office switching system normally responds to a service request on a local communication line connected thereto to selectively connect the requesting line to another selected local communication line. The connection can be made locally through only the connected central office switching system. For example, for a call from station A to station B, the SSP 211 provides the call connection without any connection to another central office. When the called line connects to a distant station, for example when station A calls station C, the connection is made through the connected central office switching system SSP 211 and at least one other central office switching system SSP 213 through the telephone trunks interconnection the two COs.

In the normal call processing, the central office switching system responds to an off-hook and receives dialed digits from the calling station. The central office switching system analyzes the received digits to determine if the call is local or not. If the called station is local and the call can be completed through the one central office, the central office switching system connects the calling station to the called station. If, however, the called station is not local, the call must be completed through one or more distant central offices, and further processing is necessary. If at this point the call were connected serially through the trunks and appropriate central offices between the caller and the called party using in channel signaling, the trunks would be engaged before a determination is made that the called line is available or busy. Particularly if the called line is busy, this would unnecessarily tie up limited trunk capacity. The CCIS system through the STPs was developed to alleviate this problem.

In the CCIS type call processing method the local central office suspends the call and sends a query message through one or more of the STPs. The query message goes to the central office to which the called station is connected, referred to as the "terminating" central office; for example, the query would go from originating SSP 211 to terminating SSP 213. The terminating central office determines whether or not the called station is busy. If the called station is busy, the terminating central office so informs the originating central office which in turn provides a busy signal to the calling station. If the called station is not busy, the terminating central office so informs the originating central office. A telephone connection is then constructed via the trunks and central offices of the network between the calling and called stations. The receiving central office then provides a ringing signal to the called station and sends ringback tone back through the connection to the calling station.

The call processing routines discussed above are similar to those used in existing networks to complete calls between stations connected to land lines. In an AIN system implementing Personal Communication Service, these normal call processing routines would still be executed for completion of calls originating from stations not subscribing to the Personal Communication Service.

In one implementation, the local SSP type COs are programmed to recognize any call directed to any one of the PCS subscribers associated therewith as a Personal Communication Service Call. In response to such a call destination type trigger, the CO associated with the destination subscriber, i.e the terminating SSP, would communicate with the ISCP via an STP to obtain all necessary call processing data to complete the PCS call to the subscriber's portable handset at its current location. It is also possible to program originating SSPs to determine whether or not outgoing calls are directed to PCS subscribers and trigger the communications with the ISCP at the originating SSP instead of the terminating SSP.

To extend special telephone services from the AIN to subscribers communicating via the mobile network will require adapting the MCs to trigger queries to the ISCP in response to outgoing call or service requests. One way to do this is to modify the switch structure and programming of the MCs so that each MC includes SSP functionality similar to that of the telephone network SSPs. Another approach is to modify the MCs to forward calls to an SSP capable switch or tandem, with outpulsing of the originating subscriber data, so as to process the calls via the tandem in manners similar to those used for non-SSP capable end offices switches discussed earlier.

PCS Handset

Although described principally as "handsets", the mobile communication units used in the Personal Communication Service (PCS) can take many forms. The mobile communication unit could take the form of a vehicle mounted unit similar to existing mobile telephones. Also, the mobile communication units might include other communication devices compatible with the system, with or without incorporating standard telephone communication components. For example, the portable unit may comprise portable facsimile devices, laptop computers etc., one or more of which might incorporate a telephone handset.

The mobile communication unit, particularly when in the form of a handset, is configured in manner similar to the cordless handsets found in the prior art, except that the PCS units include a radio transceivers operating at cellular frequencies and capable of meeting cellular signaling protocols. The compatibility with cellular systems allows the PCS mobile units to roam through existing cellular networks. A microprocessor in the mobile unit controls all operations of the unit, particularly registration procedures and associated signaling transmissions.

The PCS handset has the capability of interfacing with a base station, usually at the user's home, a local cellular system in which the user's home is located, additional cellular systems having access to the AIN, local microcell systems and any wireless Centrex/PBX to which the handset has been previously granted access. In order for the handset to gain access to the local cellular MC and microcell type PCS MC, both must be set up to transmit the same system ID (SID) and to indicate combined paging and access channels.

In order for the handset of the PCS to access its own base station as well as the macrocell MC and the microcell MC, the handset must operate at cellular frequencies. The scanning function of the handset is prioritized so as to register with its personal base station first. If the base station is not contacted the handset scans the macrocell and microcell control channels, selecting to register with the MC of the microcell system if detected before attempting to register with the MC of the macrocell system. If the handset has been granted access to a wireless Centrex system, it scans a set of control channels specially programmed into the handsets of Centrex members only. Selection of one of these special channels must be done by the specific action of the handset user, and additional handshake procedures may be carried out requiring a PIN number from the user before he is permitted to interface with the wireless Centrex.

The home base station is structurally similar to prior art cordless telephone base stations, except that the transceiver in the base station operates at cellular frequencies and uses signaling protocols similar to those of the cellular network to perform registration procedures. Of particular note here, the base station includes a microprocessor for programmed control of base station operations. To perform registration with the ISCP, the base station also includes an auto dialer, and may include means to detect call progress tones and/or certain instruction signals from the telephone network.

Registration Process for the PCS Handset

Registration from a wireline phone can occur in two modes: automatic and manual. The automatic mode assumes that the personal user has a wireless set with a personal base station which can emulate the manual code described below (a "smartcard" or other type device could also be used for any CPE so equipped). The user dials a prearranged telephone number which is translated with a Destination Number (DN) trigger for AIN processing of the call. This trigger establishes a session between the user and the ISCP known as DTMF update. The ISCP instructs the network to play an announcement and collect digits. In a manual registration procedure, the announcement typically will be a synthesized speech prompt to enter digits. Several series of digits might be collected depending on the particular service (i.e., multiple personal numbers per handset). The user then disconnects after an acknowledgement from the ISCP.

In such registration call procedures, enough information is collected from the personal user to establish their identity—including a personal identification number (for a mobile set, this would be the serial number). The Automatic Number Identification (ANI) data identifies the station from which the subscriber placed the registration call. The ISCP "registers" or stores the station identification number and uses that number as a future destination number to route future calls. Also, the system will now trigger a response to calls from the station line and apply the registered subscriber's AIN features to calls from that line.

The first registration priority of the PCS handset is its home base station. Normally the handset operates at cellular frequencies in the 800 MHz range. The control channels used for registration on both the macro cell and micro cell systems are the same as those used in a normal cellular system. However, certain channels are dedicated specifically to the personal base station for "cordless" use. Under its control program, the microprocessor first causes the handset transceiver to scan channels dedicated to base station use. Thus, if the PCS handset is in range of its base unit, registration between the base unit and the handset will take place without any further operation to register with any other overlapping system. Every base station continuously transmits its identity in an overhead information on one of the channels dedicated to the cordless service. Every portable unit has been programmed with the type, number and location of the channels dedicated to personal base unit use in the present system. When the portable unit scans the dedicated "cordless" channels, a determination is made whether the identification number of the portable unit is being transmitted by its corresponding home base station. If so, registration between the portable unit and the base unit is carried out in a manner well known in cordless telephone technology. Thus, when the handset comes within range of its base station, it will detect its identification number and register with its home base station.

The operation of an integrated hybrid system such as shown in FIG. 1 to perform automatic party location over the Internet is now described for a typical situation according to the preferred embodiment of the invention. In this example the subscriber to the service is desirous of establishing a procedure for insuring completion of a maximum of communication attempts as expeditiously as possible. The subscriber has accordingly established a list of addresses or phone numbers at which the subscriber may possibly be contacted. In this example a caller at the phone equipped PC 21 wants to establish an Internet telephone call to a called party for which the caller has a textual domain name address such as "eric.voit@phone". The caller at PC 21 enters the called subscriber's domain name address. The PC 21 transmits a query containing the entered name through the Internet access server 27 and the public packet data network 31 to the domain name server 51.

Figure 6A:
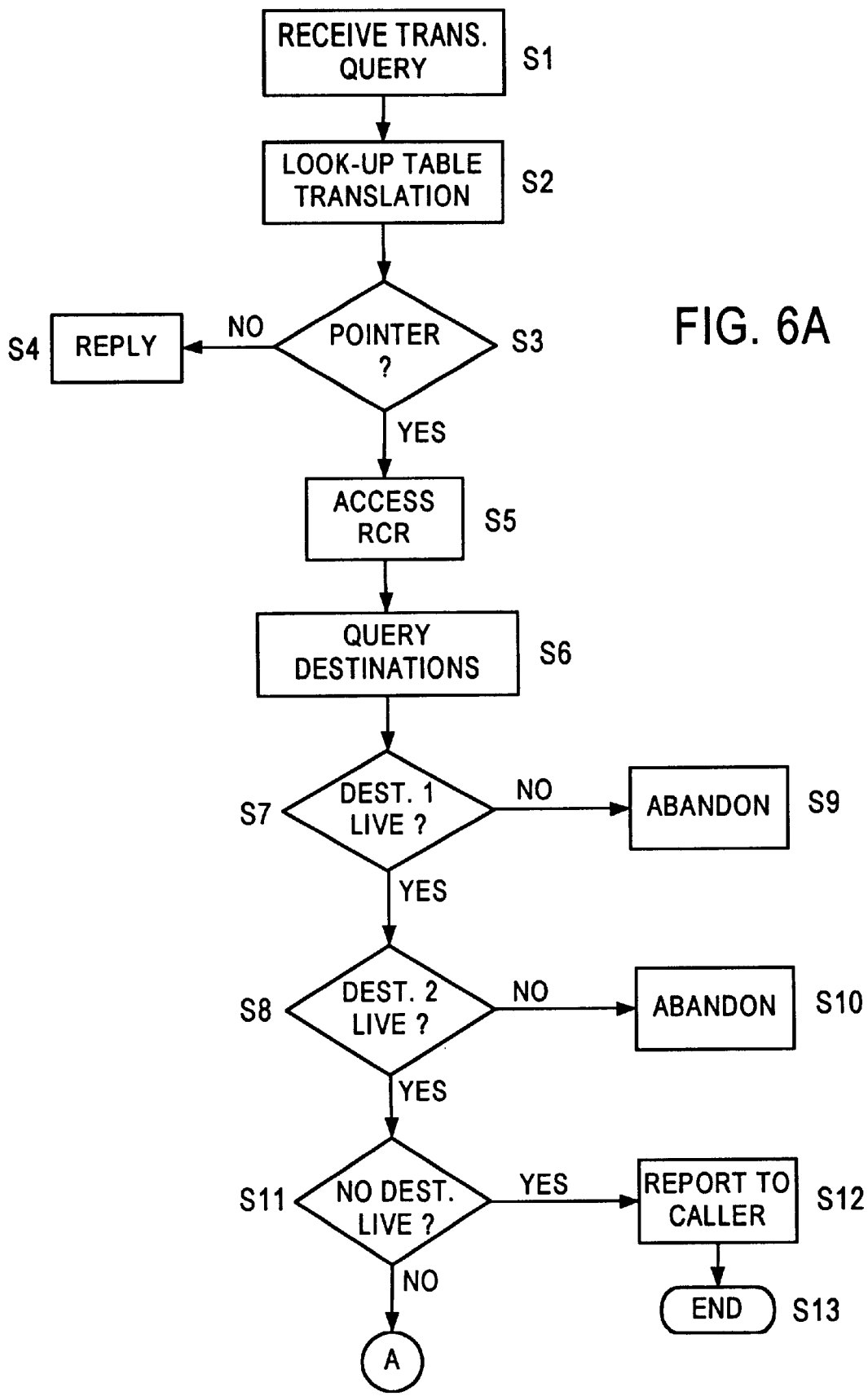
FIGS. 6A and 6B is a simplified illustration of the operation of the system and method of the invention according to one embodiment FIGS. 7A, 7B and 7C together form a flow chart depicting the call processing routine for routing calls to a Personal Communication Service subscriber according to one embodiment of the invention.

FIG. 6A provides a simplified illustration of the processing flow by the domain name server in response to this query message. In step S1, the domain name server receives the query or request for translation. The server accesses the appropriate translation table and performs a translation (step S2). Processing branches at step S3. If there is no pointer, the translation would produce an actual destination address. The domain name server would then transmit a reply (step S4) containing the destination IP address, back to the calling party's PC 21. The PC 21 would use the received IP address to send the desired message.

However, in the current example, the called party has a conditional routing service. In this case the subscriber has established that her Internet calls are to be delivered simultaneously or substantially simultaneously to the domain name "eric.voit@phone" and to the domain name "eric.voit2@phone", regardless of which of the two domain names is requested or called by the calling party. Upon achieving connection at one of these addresses, the other attempt is to be discontinued. The translation in step S2 therefore retrieves a pointer and step S3 branches processing to step S5 wherein the domain name server accesses the RCR identified by the pointer. From this point on, the domain name server processes the translation request based on the called party's RCR.

In the present example, the RCR would cause the domain name server to transmit a query message to the PC 35 and to the PC 36. These messages may be transmitted serially to substantially simultaneously reach the Internet access server 33 and the PCs 35 and 36. Alternatively the queries could be broadcasted or simulcast using the methodology described in Doeringer et al., U.S. Pat. No. 5,361,256, described hereinabove. The substantially simultaneous effect that may be achieved by serially transmitted queries makes this simpler procedure a more economical and maintenance free mode. The term "substantially simultaneously" as used herein is intended to embrace both methods.

The queries to the two addresses are sent at step S6 to determine whether or not the terminal devices are "live". As previously stated, the terminal device is "live" if it is active and accepting communication. The queries are shown branching at steps S7 and S8. If a terminal is not "live" the attempt to reach the terminal is discontinued or abandoned as shown at steps S9 and S10. In this example both terminals PC 35 and 36 are live and respond with affirmative messages. At step S14 the domain name server sends a "ring" signal along with the IP address of the calling PC 21 to both terminals PC 35 and 36, indicating that the party at PC 21 is attempting to establish a connection. At step S15 the domain name server may send to the calling PC 21 a call status signal indicating that "ringing" has commenced. Each "ring" and calling address signal to the called terminals PC 35 and 36 includes a request that the called terminal acknowledge and indicate that a connection with the supplied calling address is being initiated.

At S16 the called party responds to the acknowledgement request of the domain name server 51 from the terminal PC 35, and indicates that PC 35 is initiating a connection with the address of the PC 21, which was supplied by the domain name server. Responsive to this acknowledgement the domain name server in step S17 dispatches a message to the calling PC 21 providing the address of the PC 35, which is responding, and advising the calling PC 21 that the called party is available. At step S18 the terminal PC 35 initiates an attempt to connect with the calling terminal PC 21. At step S19 the calling PC 21 uses the address of the PC 35, which was supplied by the domain name server, to complete the connection to the terminal PC 35. The telephone communication is thereupon established from PC 21 through Internet server 27, through the Internet packet data network 31 to the Internet server 33 and PC 35. Immediately upon receipt of the acknowledgement from the first responding PC 35, the domain name server sends a "negative ring" signal to the PC 36 at step S20, and terminates that contact attempt at step S21. The "negative ring" signal may modified version of the signal established as the "ring" signal or may be a voice prompt such as "call discontinued". The "ring", "negative ring", and voice prompt signals may be initiated by the Internet server 33 on request from the domain name server, if so desired.

In the preceding example the domain name server processed an Internet telephone call to a called party or subscriber who had established a desire to be "called" at multiple personal computer or PC terminals. It is also a feature of the invention that the subscriber may establish an RCR containing the address of a mixture of computer and telephone terminals.

In this example the subscriber has established that her Internet calls are to be delivered simultaneously or substantially simultaneously to the domain name "eric.voit@phone" and the telephone number domain name "301-608-2908@phone".

In this case a caller at the phone equipped PC 21 wants to establish an Internet telephone call to a called party for which the caller again has the textual domain name address "eric.voit@phone". The caller at PC 21 enters the called subscriber's domain name address. The PC 21 transmits a query containing the entered name through the Internet access server 27 and the public packet data network 31 to the domain name server 51.

Figure 6B:
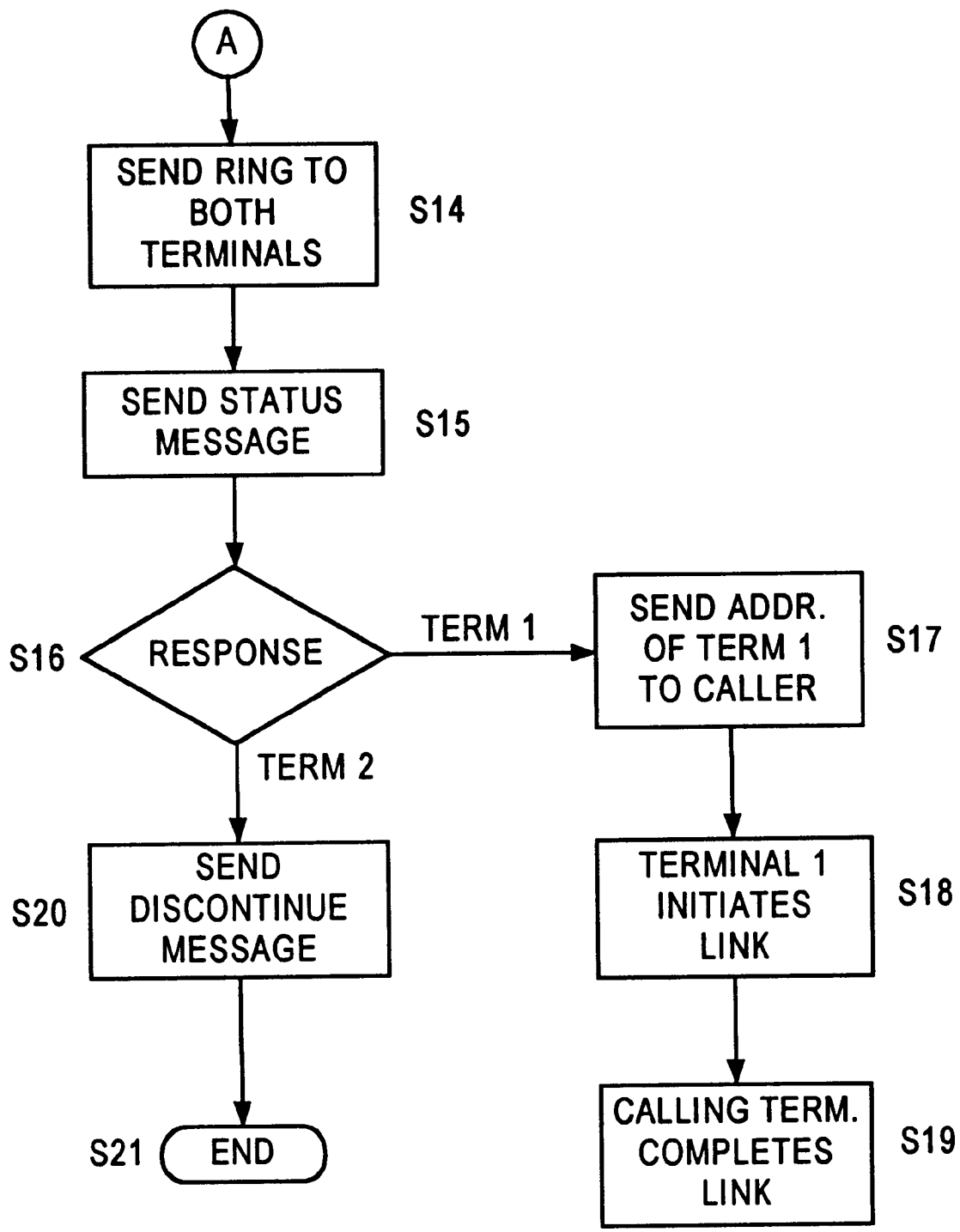

FIG. 6 again provides a simplified illustration of the processing flow by the domain name server in response to this query message. In step S1, the domain name server receives the query or request for translation. The server accesses the appropriate translation table and performs a translation (step S2). Processing branches at step S3. If there is no pointer, the translation would produce an actual destination address as described in the preceding example.

In the current example, the called party again has a conditional routing service. In this case the subscriber has established that her Internet calls are to be delivered simultaneously or substantially simultaneously to the domain name "eric.voit@phone" and the telephone domain name "301-608-2908@phone", regardless of which of the two domain names is requested or called by the calling party. In this example the telephone number 301-608-2908 is the number for the telephone station or terminal 49. The translation in step S2 therefore retrieves a pointer and step S3 branches processing to step S5 wherein the domain name server accesses the RCR identified by the pointer. From this point on, the domain name server processes the translation request based on the called party's RCR.

In the present example, the RCR would cause the domain name server to transmit a query message to the PC 35 via the Internet server 33 and to the PSTN gateway 45. As was described earlier, the PSTN gateway 45 provides a voice telephone grade interface to the public packet data network 31, for a large number of calls, between telephone networks such as the PSTN and/or cellular or PCS type mobile telephone networks. As shown in FIG. 1 the gateway 45 is connected to at least one central office (CO) 47 of the PSTN via one or more primary rate interface type ISDN line groups or a combination of one or more T1 circuits and a Simplified Message Desk Interface type signaling circuit. The line circuits provide digital line interconnections of the gateway 45 to the central office 47. The PSTN gateway 45 includes one or more computers for processing individual calls. The computer(s) include appropriate line interfaces for answering incoming calls and initiating outgoing calls over the particular type of line circuits. The interfaces also receive and decode standard signaling messages from the PSTN, e.g., DTMF dialing signals, and detect line status and call progress signals on incoming and outgoing calls.

Depending upon the nature of the connection between the gateway and the central office the PSTN gateway would send a signaling message to the CO 47 to ascertain whether or not the telephone terminal 49 was available or "live", i.e., on-hook.

The queries to the two addresses are sent at step S6 to determine whether or not the terminal devices are "live". The queries are shown branching at steps S7 and S8. If a terminal is not "live" the attempt to reach the terminal is abandoned as shown at steps S9 and S10. The telephone terminal 49 is not "live" if it is off-hook. In this example both terminals PC 35 and 49 are "live" and respond with affirmative messages. In the case of the telephone terminal 49 this message or signal is sent from the CO 47 to the PSTN gateway 45 and thence to the domain name server 51. The message is the same as would be obtained in a common channel signaling query for the availability of a line. The gateway 45 translates this into TCP/IP format for delivery through the Internet.

At step S14 the domain name server sends a "ring" signal along with the IP address of the calling PC 21 to the terminal PC 35 and to the gateway 45, indicating that the party at PC 21 is attempting to establish a connection. This "ring" signal is transmitted by the gateway 45 to the CO 47 as a connect request which results in the CO transmitting a ring signal to the telephone terminal 49. At step S15 the domain name server may send to the calling PC 21 a call status signal indicating that "ringing" has commenced. The "ring" and calling address signal to the called terminal PC 35 and to the gateway 45 includes a request that the called terminal acknowledge and indicate that a connection with the supplied calling address is being initiated.

At S16 the called party responds to the acknowledgement request of the domain name server 51 by going off-hook at the telephone terminal 49. The gateway translates the off-hook signal that it receives from the CO to a TCP/IP response to the domain name message and transmits this response to the domain name server. Responsive to this acknowledgement the domain name server in step S17 dispatches a message to the calling PC 21 providing the IP address of the telephone station 49, which is responding, and advising the calling PC 21 that the called party is available.

At step S18 the gateway translates the off-hook signal to a request for Internet connection and transmits that request to the IP address of the terminal 21 which the domain name server supplied to the gateway. At step S19 the calling PC 21 uses the address of the telephone terminal 49, which was supplied by the domain name server, to complete the connection to the terminal 49. The telephone communication is thereupon established from PC 21 through Internet server 27, through the Internet packet data network 31 to the PSTN gateway 45 and telephone terminal 49. Immediately upon receipt of the acknowledgement from the first responding terminal, i.e., the telephone terminal 49, the domain name server sends a "negative ring" signal to the PC 35 at step S20, and terminates that contact attempt at step S21.

Figure 7A:
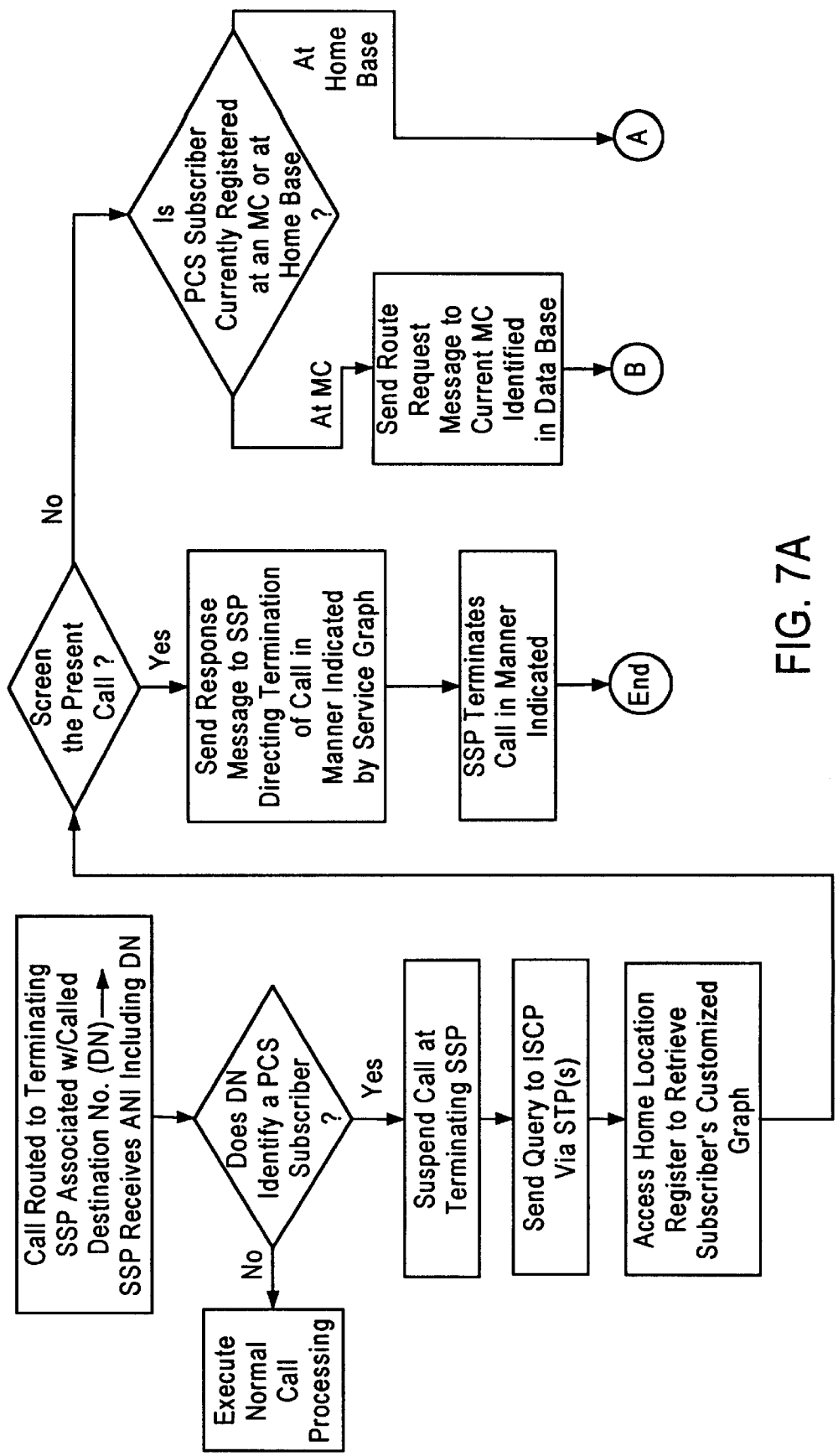
Figure 7B:
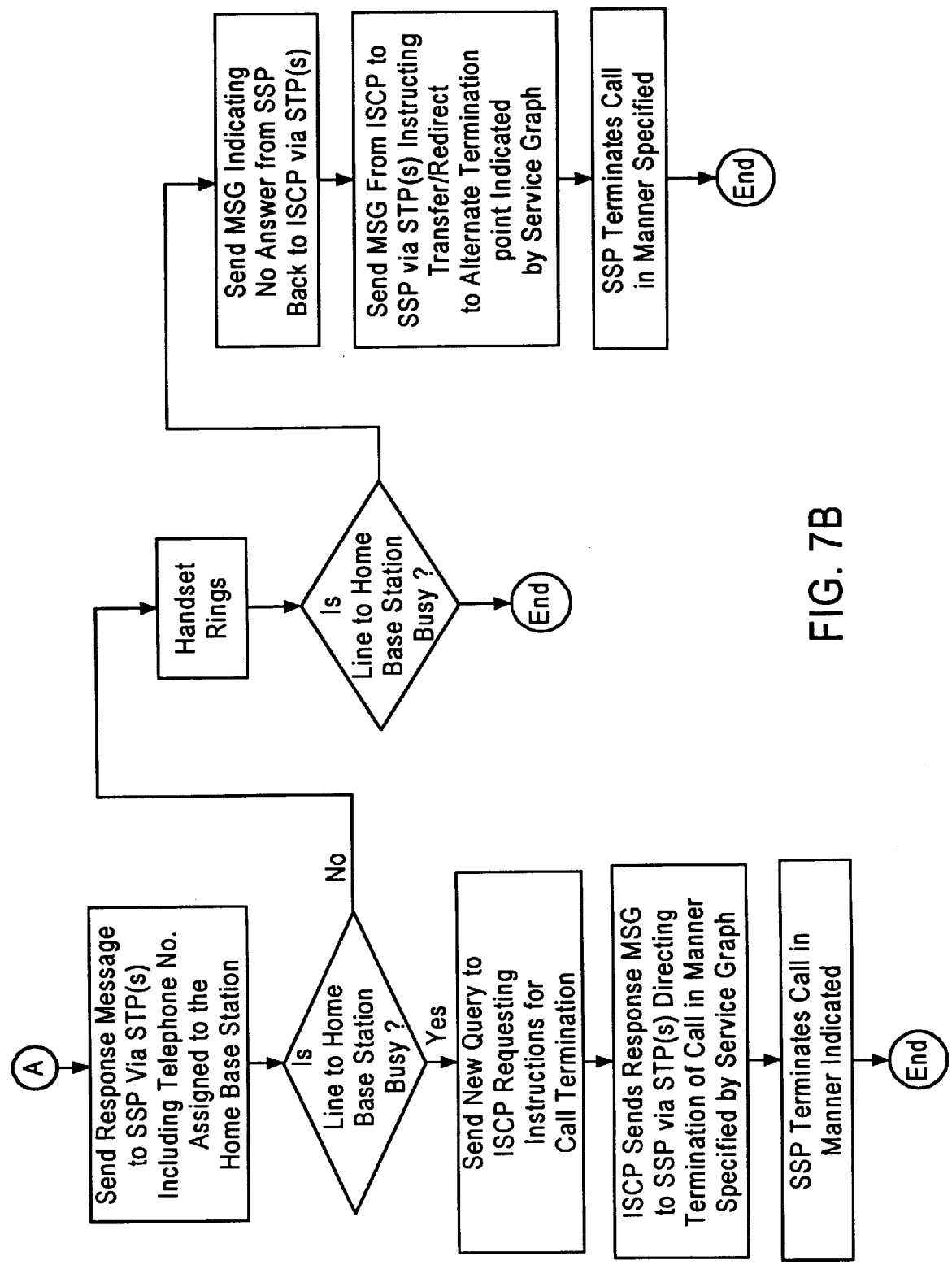
Figure 7C:
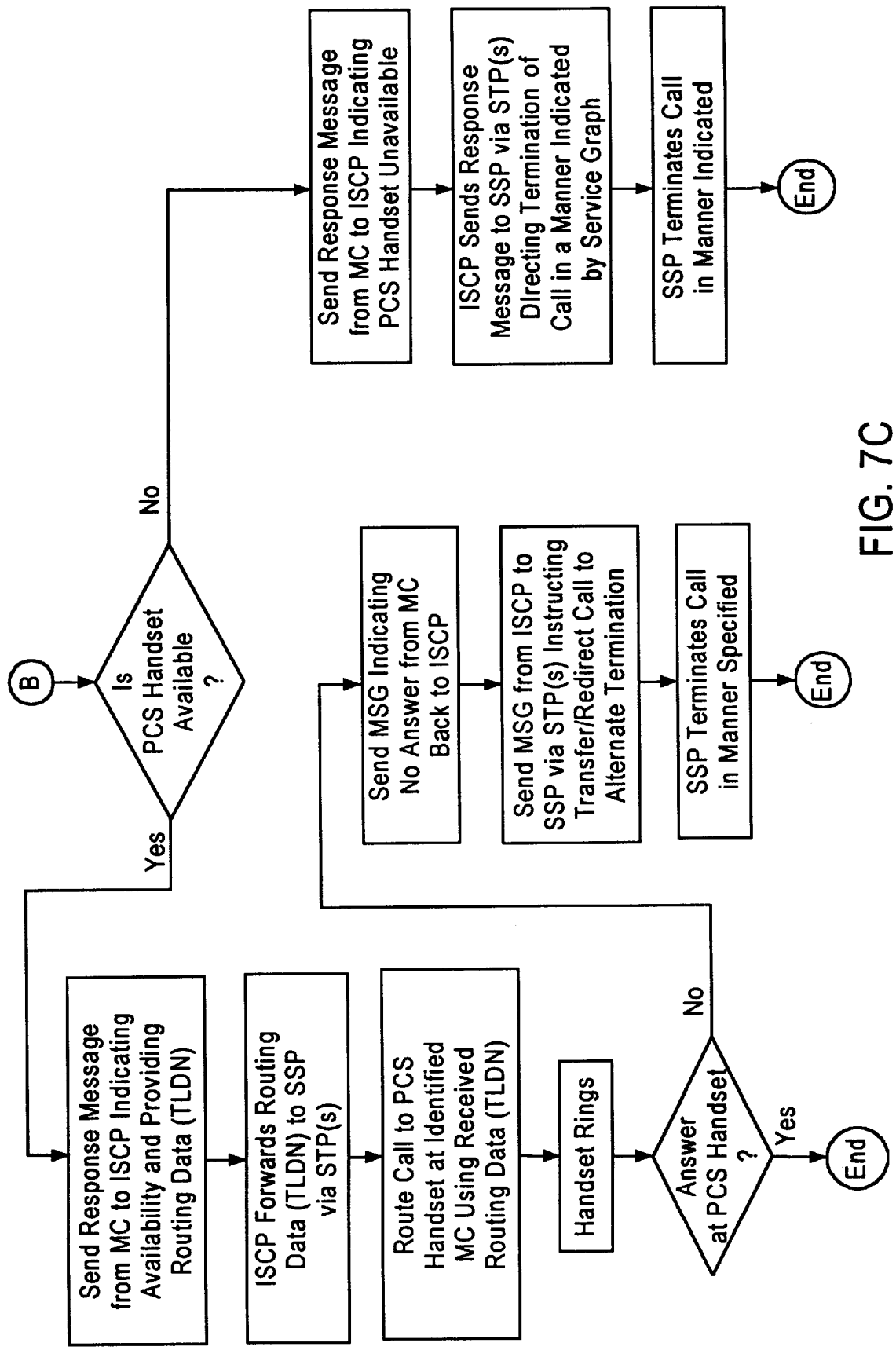

Referring to FIGS. 4 and 5 and the flow diagrams in FIGS. 7A, 7B, and 7C, an example of operation is described wherein a subscriber John Doe has specified that his Internet calls are to be delivered according to the method and system of the invention simultaneously to the domain name "eric.voit@phone" and to the Personal Communication Service or "PCS" domain name "412-999-1234@phone". Assume that John's home base is base station unit 216 in FIG. 5. PCS subscriber John Doe's number is normally assigned to an SSP 217 in the Pittsburgh area, but the latest registration indicates availability through a cellular MC 222 in the Washington, D.C. area. The PSTN gateway 45 in FIG. 1 is connected to the CO/SSP 47 which in this example is assumed to be the CO/SSP 215 in FIG. 5.

A caller at the phone equipped PC 21 in FIG. 1 wants to establish an Internet telephone call to John Doe for which the caller has the textual domain name address "eric.voit@phone". The caller at PC 21 enters that domain name address. The PC 21 transmits a query containing the entered name "eric.voit@phone" through the Internet access server 27 and the public packet data network 31 to the domain name server 51.

FIG. 6 again provides a simplified illustration of the processing flow by the domain name server in response to this query message. In step S1, the domain name server receives the query or request for translation. The server accesses the appropriate translation table and performs a translation (step S2). Processing branches at step S3. If there is no pointer, the translation would produce an actual destination address as previously described. In this example the John Doe has a conditional routing service directing that his Internet calls are to be delivered simultaneously or substantially simultaneously to the domain name "eric.voit@phone" and the PCS telephone domain name "412-999-1234@phone". The translation in step S2 therefore retrieves a pointer and step S3 branches processing to step S5 wherein the domain name server accesses the RCR identified by the pointer. From this point on, the domain name server processes the translation request based on the called party's RCR.

In the present example, the RCR would cause the domain name server to transmit a query message to the PC 35 via the Internet server 33 and also to transmit the query to the PSTN gateway 45 for processing and transmittal towards the PCS terminal. The PSTN gateway processes this message and sends a signaling message to the CO/SPP 47. In this example the CO/SSP 47 is the same as the CO/SSP 215 in FIG. 5. The RCR of John Doe has been formulated with the knowledge that the number 412-999-1234 is a PCS number. As a result the RCR includes instructions directing that the initial off-hook indication caused by the signaling to the PCS network is not to be accepted as a "live" indication. SSP 215 in FIG. 5 and the rest of the telephone network in that figure process the call as a standard land line telephone call until it reaches SSP 217. The SSP 217 recognizes John Doe's DN 412-999-1234 as an indication of an AIN call.

In response to the call destination type trigger, the SSP 217 suspends call processing and sends a query to the ISCP. The query is in TCAP format and includes the ANI data which identifies the originating SSP 215 (CO/SSP 47) and the destination number 412-999-1234. In this specific example, the terminating SSP 217 suspends processing of the call to John Doe and sends a query identifying both the originating SSP and John Doe to the ISCP 240 via STPs 225 and 231 and the interconnecting data links.

The ISCP uses the PCS number received with the query from the SSP to identify the subscriber's home location register (HLR). Typically, the PCS subscriber's home location file will provide a complete service graph (like a flow chart) to control further processing of the incoming call based on certain conditions of the current call. Each PCS subscriber has a corresponding service graph, and each subscriber can have their graph customized to suit their own business and/or life style. The ISCP looks at the ANI data and decides how to process the current call based on the subscriber's customized service graph which reflects that procedures for Internet calls are to be processed.

If the present call is to be allowed according to the service graph, the ISCP next examines the PCS subscriber's file in its data base to determine where the PCS subscriber is currently registered. If the user is registered in the mobile environment, i.e., at an identified MC, then the ISCP must obtain routing data from the Visiting Location Register (VLR) assigned to the subscriber's communication terminal in the identified MC, to determine a routing address or other condition. The ISCP therefore launches an IS-41 query addressed to the identified MC. This query goes through the SS7 network to MCs such as shown in FIG. 5, which have SS7 communication links with an STP. The query is received by the addressed MC. If the identified MC is an outside MC having X.25 communication only, the query goes through a hub STP, such as 53 in FIG. 5, and the X.25 network.

The MC then determines if the PCS handset is currently available. If so, the MC sends an IS-41 response message to the ISCP. This response message provides routing data for the PCS subscriber from the Visiting Location Register (VLR) currently assigned to that subscriber in the MC. This routing data, for example, includes the Temporary Local Directory Number (TLDN) which the MC has assigned to the visiting PCS subscriber who is roaming.

The ISCP then formulates a TCAP response message based on the received routing data. In this TCAP message, the destination field would contain the assigned TLDN. The message is sent back to the terminating SSP office through the STP(s) and SS7 data networks. The SSP then uses the routing data to route the call to the MC and forwards the TLDN to the MC to set up the wireless link to the PCS handset. The "live" signal is then sent back through the data network in the telephone network of FIG. 5 to the PSTN gateway and via the Internet data network to the domain name server 51 in FIG. 1. The PC 35 at John Doe's home is not live. Thus the "ring" signal is sent by the domain name server for ultimate delivery of a "ring" signal to the handset in this situation. This signal proceeds through the Internet data network, PSTN gateway and SS7 network in FIG. 5.

At this point the PCS handset in the MC controller's area rings. In this example, the SSP 217 has routed the call through the voice trunk network and SSP 215 to the cellular MC 222. The MC 222 sends an addressed command signal to John's PCS handset, and the handset rings. If the subscriber answers the handset, the response has been achieved at step S16 in FIG. 6.

The gateway translates the off-hook signal that it receives from the CO to a TCP/IP response to the domain name message and transmits this response to the domain name server. Responsive to this acknowledgement the domain name server in step S17 dispatches a message to the calling PC 21 providing the IP address of the telephone station of the PCS number, which is responding, and advising the calling PC 21 that the called party is available. At step S18 the gateway translates the off-hook signal to a request for Internet connection and transmits that request to the IP address of the terminal 21 which the domain name server supplied to the PSTN gateway. At step S19 the calling PC 21 uses the address of the PCS number, which was supplied by the domain name server, to complete the connection to John Doe's handset The telephone communication is thereupon established from PC 21 through Internet server 27, through the Internet packet data network 31 to the PSTN gateway 45 and John Doe's handset. The call processing routine for routing calls to a Personal Communication Service subscriber are illustrated in the flow chart in FIGS. 7A, 7B, and 7C.

Figure 8:
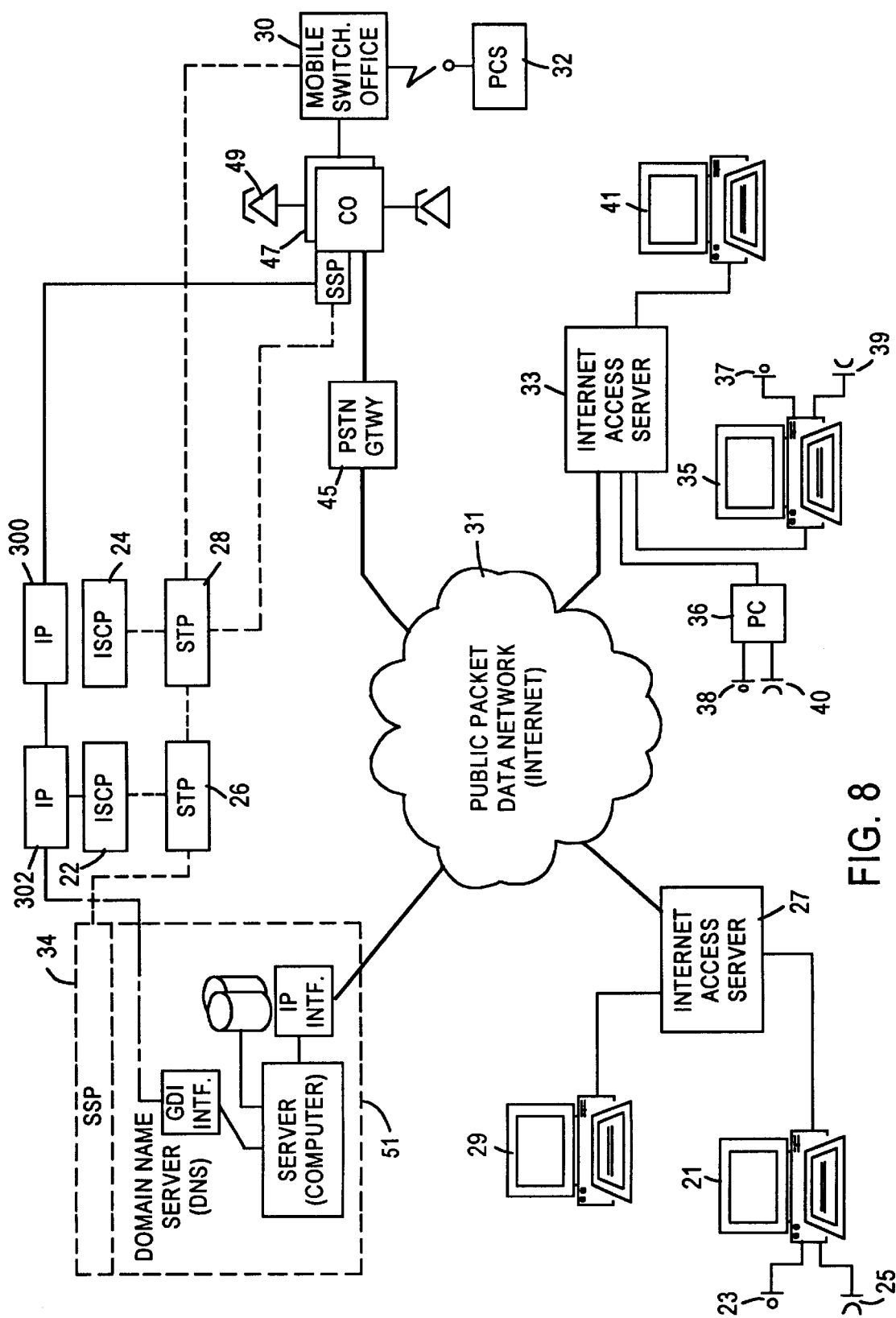
FIG. 8 is a simplified diagram of an Internet system with both data and telephone communication capabilities including enhanced domain name processing and provisioning capabilities according to a further embodiment of the invention.
Figure 9:
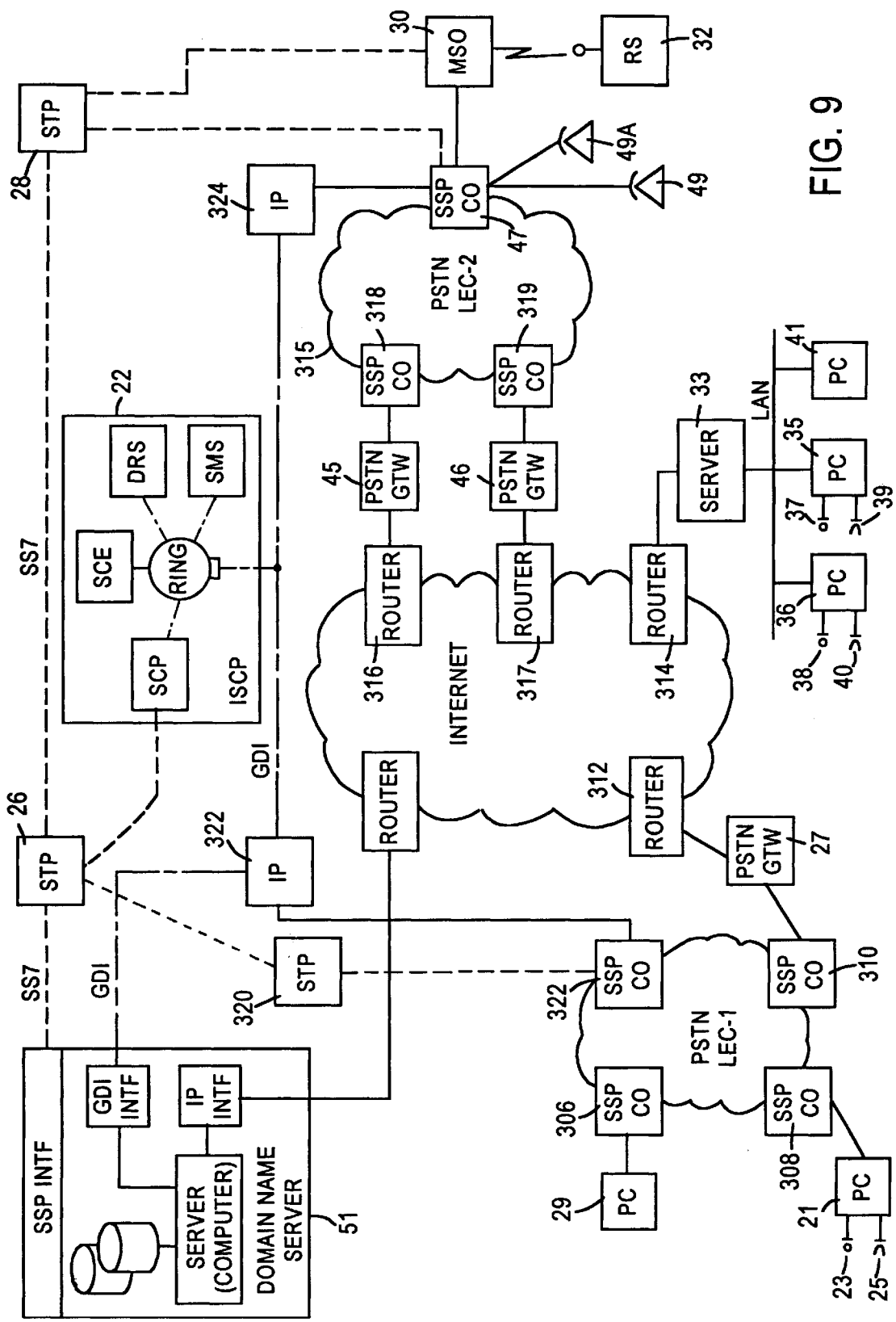
FIG. 9 is a more detailed diagram of the system shown in FIG. 8.

Referring to FIG. 8 there is shown a simplified diagram of an Internet system of the type described which is provided with improved provisioning capabilities according to a further embodiment of the invention. FIG. 8 is similar to FIG. 1 with the addition of intelligent peripherals 300 and 302, which are linked together and to the SSP/CO 47, the ISCP 22, and the domain name server (DNS) 51 in a manner presently to be described. FIG. 9 provides a more detailed showing of the system and attention is directed to that Figure and the following description.

FIG. 9 shows the same elements as are shown in FIG. 8 identified by the same reference numerals. As previously described, the Internet Access Server 27 is coupled to the PCs 21 and 29 via the public switched telephone network (PSTN) for dial-up communications. The PSTN is illustrated in FIG. 9 as a cloud 304 which may be one local exchange carrier LEC-1. The PCs 21 and 29 are shown connected to the PSTN via SSP/COs 306 and 308. The server 27 in turn is shown connected to the PSTN via an SSP/CO 310. The server 27 is connected to the Internet cloud 31 via an IP router 312 within that network. The PCs 35, 36, and 41 are connected to the Internet Access Server 33 over a 10baseT Ethernet LAN and the server is connected to the Internet via an IP router 314.

The PSTN gateway 45 has previously been described as one of several such gateways providing access through the PSTN to standard telephones such as those shown at 49 and 49A. FIG. 9 shows that PSTN as a second local exchange carrier LEC-2 at 315. An additional illustrative PSTN gateway is shown at 46. Such gateways are connected to the Internet by IP routers 316 and 317, and to the PSTN LEC-2 through SSP/COs 318 and 319. As in FIG. 8 the SSP/CO 47 and MSO 30 are linked to the DNS 51 via CCIS SS7 links and STPs 26 and 28. The STP 26 is linked to the ISCP 22 and to the PSTN LEC-1 via STP 320 and SSP/CO 322 in PSTN LEC-1 304.

As previously described in relation to FIG. 5, the ISCP 22 is an integrated system and, among other system components, includes a Service Management System (SMS), a Data and Reporting System (DRS) and the actual database referred to as a Service Control Point (SCP). The ISCP also typically includes a terminal subsystem referred to as a Service Creation Environment or SCE for programming the database in the SCP for the services subscribed to by each individual customer. The components of the ISCP are connected by an internal, high-speed data network, such as a token ring network shown at RING. For simplicity, only the ISCP 22 is illustrated in FIG. 9.

In the foregoing discussion each central office or CO has been referred to as an SSP/CO. The Service Switching Points, referred to as SSP's, are appropriately equipped programmable switches present in the telephone network, which recognize AIN type calls, launch queries to the ISCP and receive commands and data from the ISCP to further process the AIN calls. In the illustrated embodiment, the SSP/COs are end offices.

As shown in FIG. 9, all of the end office switches or SSP/COs are equipped and programmed to serve as SSP's. The illustrated embodiment is perhaps an ideal implementation which would make a variety of Advance Intelligent Network AIN services widely available at the local office level throughout the network. Other AIN implementations provide the SSP functionality only at selected points in the network, and end offices without such functionality forward calls to one of the SSP's.

SSP capable central office switching systems typically consist of a programmable digital switch with CCIS communications capabilities. A suitable SSP capable CO switch may be a 5ESS type switch manufactured by AT&T or a comparable switch manufactured by other vendors, such as Northern Telecom and Seimens. The structure of an exemplary CO which may serve as the SSP type COs in the system is now discussed in more detail below, with regard to FIG. 10.

Figure 10:
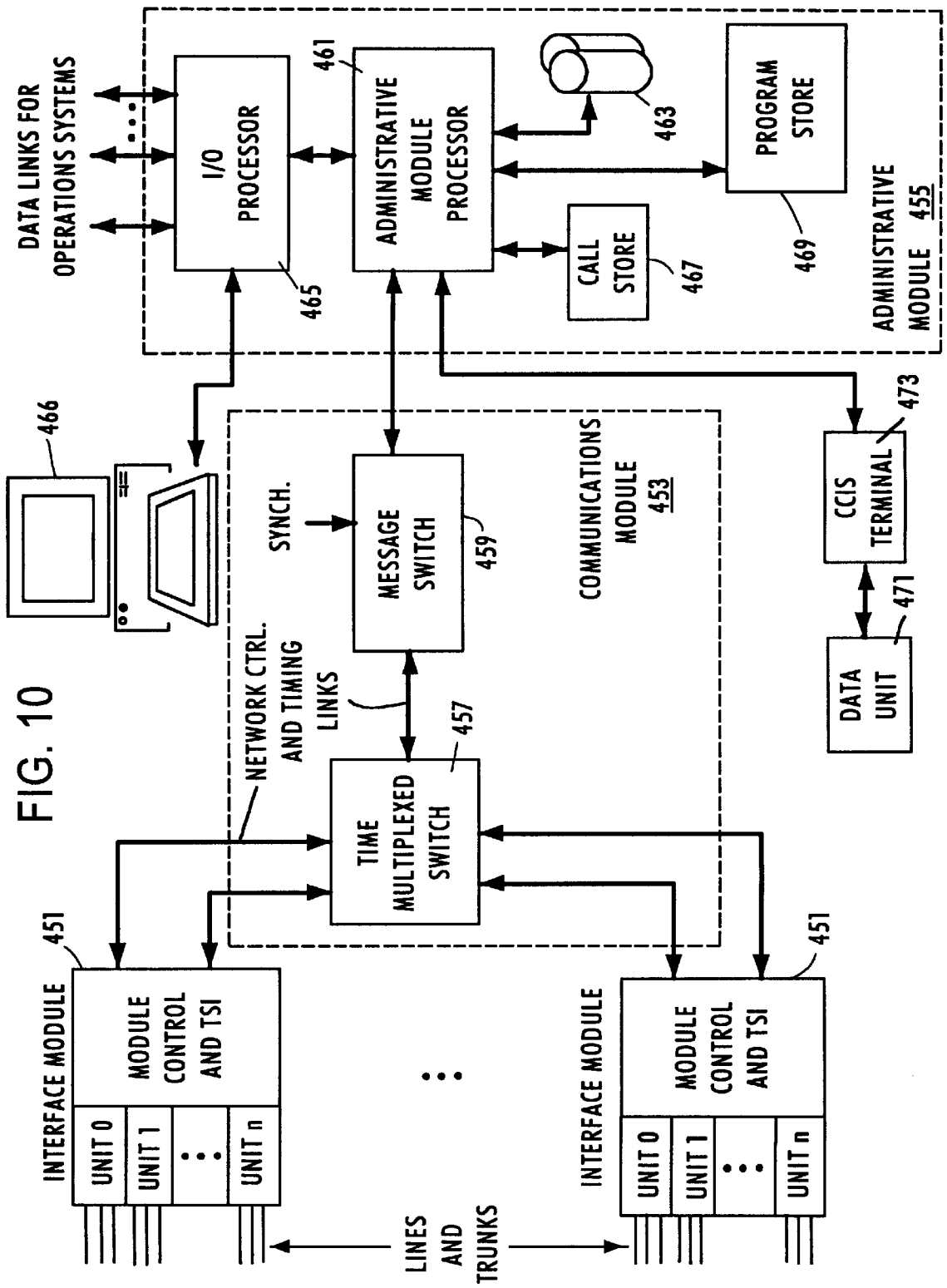
FIG. 10 is a diagram of a preferred SSP type central office (CO) used in the preferred intelligent network implementation of the invention.

FIG. 10 is a simplified block diagram of an electronic program controlled switch which may be used as any one of the SSP type COs in the system of FIG. 9. As illustrated, the CO switch includes a number of different types of modules. In particular, the illustrated switch includes interface modules 451 (only two of which are shown), a communications module 453, and an administrative module 455.

The interface modules 451 each include a number of interface units 0 to n. The interface units terminate lines from subscribers' stations, trunks, T1 carrier facilities, etc. Where the interfaced circuit is analog, for example a subscriber loop, the interface unit will provide analog to digital conversion and digital to analog conversion. Alternatively, the lines or trunks may use digital protocols such as T1 or ISDN. Each interface module 451 also includes a digital service unit (not shown) which is used to generate call progress tones.

Each interface module 451 includes, in addition to the noted interface units, a duplex microprocessor based module controller and a duplex time slot interchange, referred to as a TSI in the drawing. Digital words representative of voice information are transferred in two directions between interface units via the time slot interchange (intramodule call connections) or transmitted in two directions through the network control and timing links to the time multiplexed switch 457 and thence to another interface module (intermodule call connection).

The communication module 453 includes the time multiplexed switch 457 and a message switch 459. The time multiplexed switch 457 provides time division transfer of digital voice data packets between voice channels of the interface modules 451 and transfers data messages between the interface modules. The message switch 459 interfaces the administrative module 455 to the time multiplexed switch 457, so as to provide a route through the time multiplexed switch permitting two-way transfer of control related messages between the interface modules 451 and the administrative module 455. In addition, the message switch 459 terminates special data links, for example a link for receiving a synchronization carrier used to maintain digital synchronism.

The administrative module 455 includes an administrative module processor 461, which is a computer equipped with disc storage 463, for overall control of CO operations. The administrative module processor 461 communicates with the interface modules 451 through the communication module 455. The administrative module 455 also includes one or more input/output (I/O) processors 465 providing interfaces to terminal devices for technicians such as shown at 466 in the drawing and data links to operations systems for traffic, billing, maintenance data, etc. A CCIS terminal 473 and an associated data unit 471 provide a signaling link between the administrative module processor 461 and an SS7 network connection to an STP or the like (see FIG. 9), for facilitating call processing signal communications with other CO's and with the ISCP 440.

As illustrated in FIG. 10, the administrative module 455 also includes a call store 467 and a program store 469. Although shown as separate elements for convenience, these are typically implemented as memory elements within the computer serving as the administrative module processor 461. For each call in progress, the call store 467 stores translation information retrieved from disc storage 463 together with routing information and any temporary information needed for processing the call. For example, for a switch based Centrex type service, the call store 467 would receive and store extension number translation information for the business customer corresponding to an off-hook line initiating a call. The program store 469 stores program instructions which direct operations of the computer serving as the administrative module processor.

In accord with the present invention, one or more peripheral platforms are added to the network to provide auxiliary call processing capabilities. As shown in FIG. 9, at least one of the SSP type central offices in each PSTN LEC-1 and LEC-2 connects to a peripheral platform 322 and 324, respectively. In the preferred embodiment, the peripheral platforms each connect to the associated SSP switch via a primary rate Integrated Services Digital Network (ISDN) link through an appropriate interface unit in one of the interface modules 451 of the switch (see FIG. 10). The ISDN link carries both voice and signaling data. The peripheral platforms comprise what are now referred to as "Intelligent Peripherals" or "IPs". The IPs are also connected to the ISCP and to the DNS 51 via a second signaling network which will provide higher capacity data transport than the SS7 transport in the CCIS AIN network. The second communication system may use TCP/IP, a proprietary protocol +1129, or a Generic Data Interface (GDI). This second network connection is shown by dashed and dotted lines to illustrate the links.

One IP may connect to one SSP, similar to the system shown in FIG. 9. Alternatively, an IP may connect to two or more switching systems, or two or more IPs may connect to the same switching office. The precise number of IPs in the network and the number thereof connected to different switching systems is determined by projected traffic demands for IP service features from the subscribers' lines connected to the various switching systems. One IP may serve one LEC and deliver the necessary signals to other switching systems through the LEC network.

In the preferred embodiment, the connection from the IP to the SSP would utilize a primary rate ISDN type trunk line for carrying both voice channels and signaling information. However, a number of alternate implementations of this connection can be used. For example, the connection may take the form of a T1 circuit carrying a number of Multiplexed Centrex line channels. If additional data signaling is necessary from the switch to the IP, a Simplified Message Desk Interface (SMDI) link can be provided. SMDI is a standard form of maintenance port, available on many types of telephone switching systems, through which calling party number information can be supplied. For older switching systems not capable of call transfer through ISDN signaling or signaling on T1 Centrex lines, an additional switch could be added between the IP and the SSP.

Figure 11:
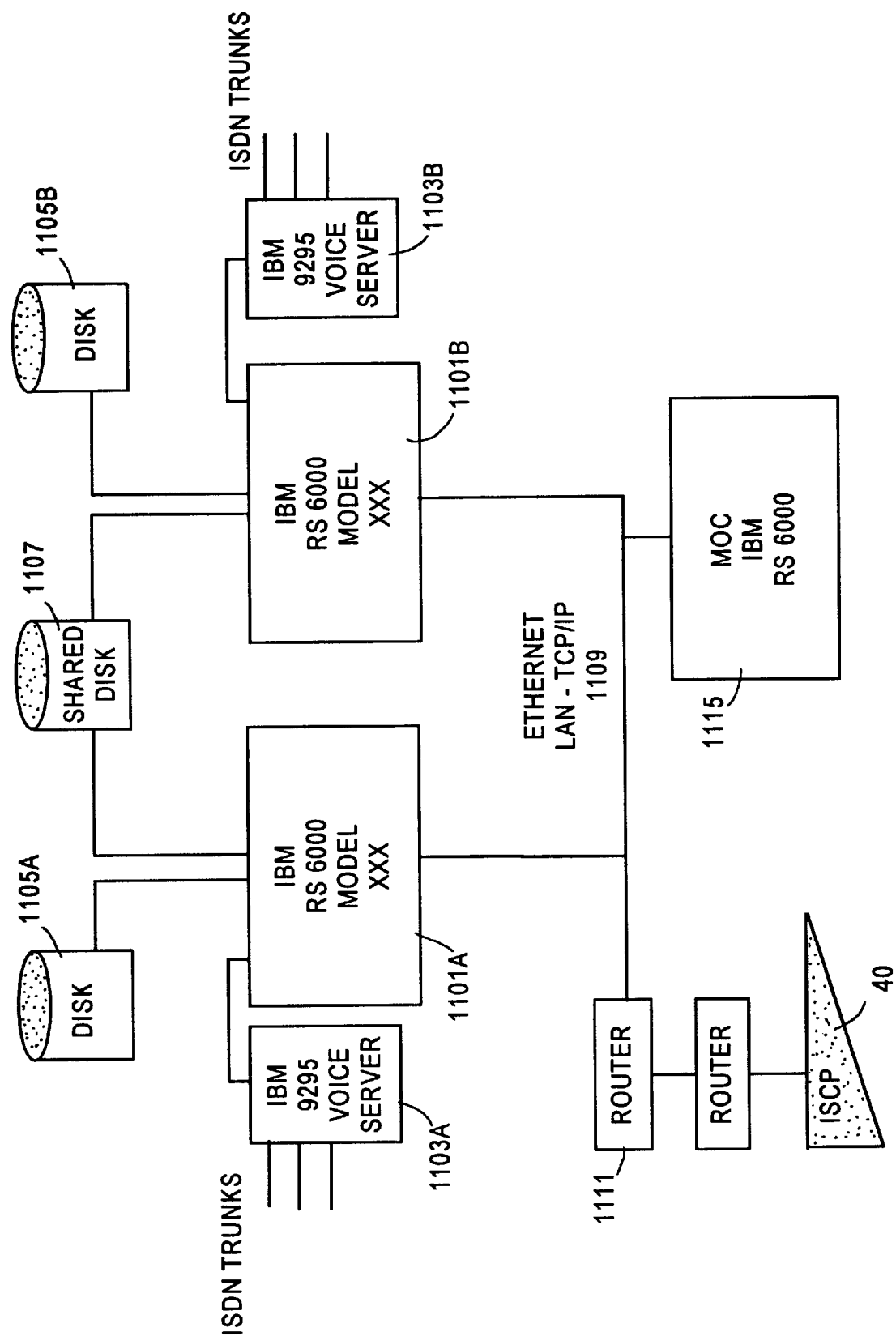
FIG. 11 is a schematic block diagram of one embodiment of an intelligent peripheral for use in the present invention.

FIG. 11 illustrates a first, preferred embodiment of the IP used in the network of FIG. 9. In this implementation, the IP will consist of two or more general purpose computers 1101A, 1101B, such as IBM RS-6000s. Each general purpose computer will include a digital voice processing card for sending and receiving speech and other audio frequency signals, such as an IBM D-talk 600. Each voice processing card will connect to a voice server card 1103A or 1103B which provides the actual interface to T1 or primary rate interface ISDN trunks to the SSP type switching office. The plurality of computers may have associated dedicated disk storage 1105A, 1105B, and the IP will included a shared disk memory 1107. Each computer will also include an interface card for providing two-way communications over an internal data communications system, an Ethernet type local area network 1109. The Ethernet carries communications between the individual computers and between the computers and a router which provides an interconnection to the second signaling communications network going to the ISCP. The IP may also include another general purpose computer 1115 configured as a terminal subsystem, for use as a maintenance and operations center (MOC) and providing operations personnel access to the IP. The number of processors provided in the IP and the number of voice servers will depend on project service demands. One additional processor and associated voice server will be provided as a backup.

Each general purpose computer 1101A, 1101B will run a node manager, an IP/ISCP Interface program, appropriate voice processing software and a variety of application software modules to offer the proposed services of the IP. The central administrator or "Node Manager" program module, running on each computer, will monitor and control the various IP resources and operations.

The digital voice processing card and associated software will provide speech synthesis, speech recognition capabilities and DTMF tone signal reception, for use in a number of different applications. The speech synthesis and DTMF tone signal reception, for example will replace the announcement and digit collection functions of the SSP switches in various existing AIN services. The general purpose computers and associated circuits will also run a variety of other types of service program modules, for example a voice mail server module and/or a fax mail server module.

Figure 12:
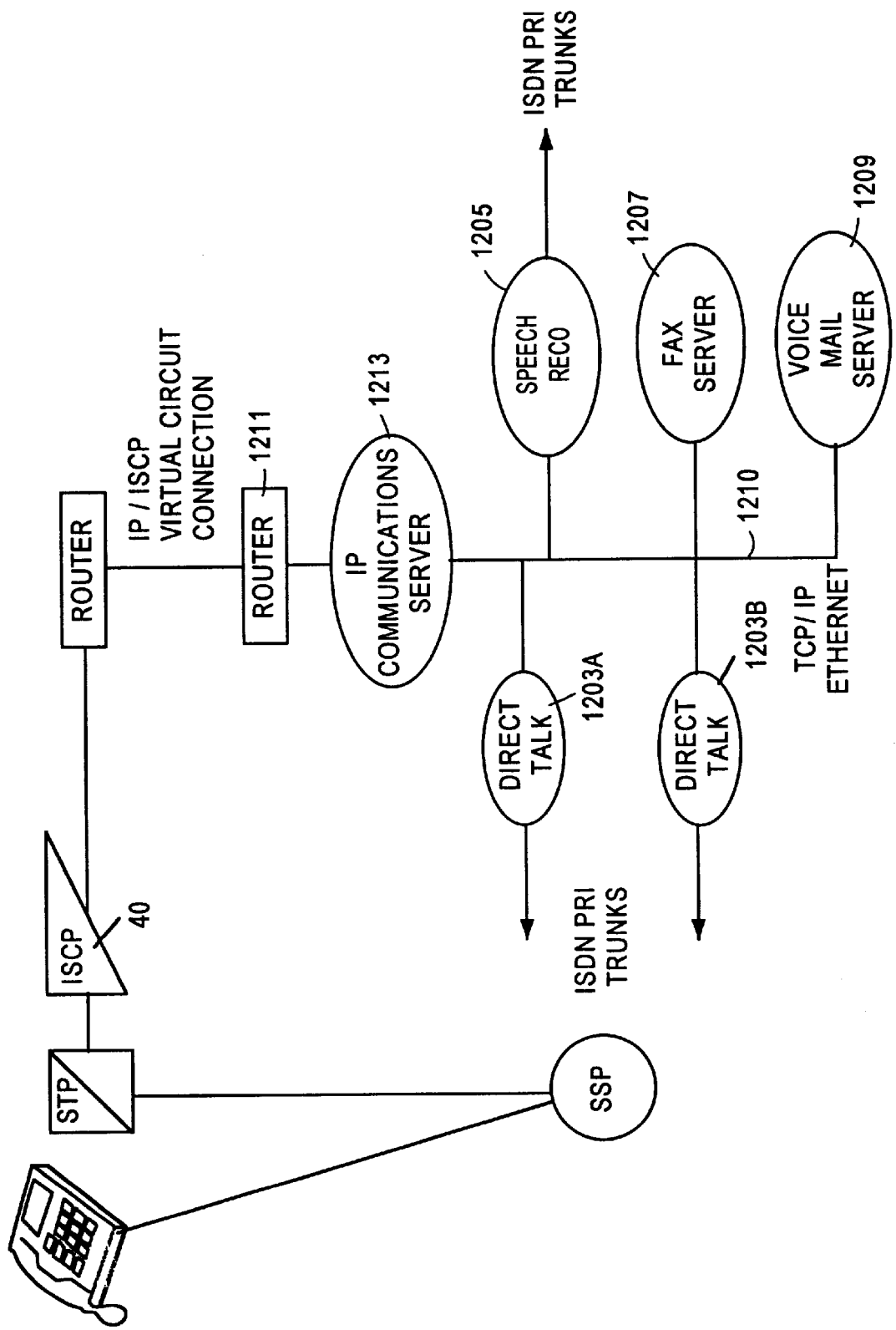
FIG. 12 is another schematic block diagram of one embodiment of an intelligent peripheral for use in the present invention.

FIG. 12 illustrates an alternate embodiment of an IP which may be used in the network of FIG. 9. The alternate architecture utilizes separate modules for different types of services or functions, for example, one or two Direct Talk type voice server modules 1203A, 1203B for interfacing the trunk to the SSP, a separate module 1205 for speech recognition, a server module 1209 for voice mail, and another server 1207 for fax mail services, etc. The various modules communicate with one another via an data communication system 1210, which again may be an Ethernet type local area network.

The Direct Talk modules 1203A, 1203B provide voice message transmission and dialed digit collection capabilities, as in the earlier embodiment. The modules 1203A, 1203B also provide line interfaces for communications to and from those servers which do not incorporate line interfaces. For example, for facsimile mail, the Direct Talk module connected to a call would demodulate incoming data and convert the data to a digital format compatible with the internal data communication network 1210. The data would then be transferred over network 1210 to the fax server 1207. For outgoing facsimile transmission, the server 1207 would transfer the data to one of the Direct Talk modules over the network 1210. The Direct Talk module would reformat and/or modulate the data as appropriate for transmission over the ISDN link to the SSP. The Direct Talk modules provide a similar interface function for the other servers, such as the voice mail server 1209.

The illustrated IP also includes a communication server 1213. The communication server 1213 connects between the data communication system 1210 and the router 1211 which provides communications access to the second signaling communication system and the ISCP 40 and other IP's which connect to that signaling communication system. The communication server 1213 controls communications between the modules within the IP and the second signaling communication system.

In each of the proposed architectures, the SSP switch would route calls to the different elements of the IP in response to instructions from the ISCP. In the initial implementation using general purpose computers (FIG. 11), each of which offers all service functionalities, the decision to route to a particular one of the computers would be a resource availability/allocation decision. If necessary data can be exchanged between the computers via the internal data communications network, e.g., if a message for a particular subscriber's service is stored in the disc memory associated with one computer but the other computer is actually processing the call. In the second implementation (FIG. 12), however, the ISCP would instruct the SSP to route the call to the particular line to the specific module capable of providing a calling customer's individual service. For example, if the subscriber has some form of speech recognition service, the call would be routed to the speech recognition module 1205. If the subscriber has a voice mail service, however, the ISCP would instruct the SSP to route the call to one of the lines going to one of the voice server modules 1203A, 1203B. The module 1203A, or 1203B would receive outgoing voice messages from the voice mail server 1209 for transmission to the caller. The module 1203A or 1203B would decode DTMF signals and supply appropriate data to the voice mail server, for control purposes. The module 1203A or 1203B would also format incoming voice messages for transmission over internal network 1210 and storage by server 1209.

According to one preferred embodiment of the invention the IPs may communicate with the ISCP using a proprietary protocol +1129 developed for the project described in U.S. Pat. No. 5,572,583, issued Nov. 5, 1996, to Wheeler and Farris, entitled Advanced Intelligent Network With Intelligent Peripherals Interfaced to the Integrated Services Control Point, and assigned to the assignee of the instant application. As will be described in further detail, during a call a trigger event occurs. The SSP thereupon queries the ISCP. The ISCP responds by instructing the SSP to route the call to the IP, using standard TCAP protocol messages. Substantially simultaneously the ISCP uses the +1129 protocol on the second signaling network to send to the IP, one or a sequence of instructions as to how to process the particular call which is sent by the SSP. The message set defined by this protocol is as follows:

ProvideInstructions—message sent by the IP to ask ISCP software for information on handling a call. Begins a transaction and provides necessary information to start the appropriate MSAP script.

CallInfoToResource—sent by ISCP software to the IP to inform it to play messages to the caller and/or collect and return digits entered by the caller. May inform the IP to terminate the call.

CallInfoFromResource—message sent by the IP in response to the preceding CallInfoToResource message. Includes result code and collected digits.

SwitchInfoToResource—message sent by ISCP software to provide the IP with the information it needs to transfer the call elsewhere. This message and the following one are not part of TA-NWT-001129.

SwitchInfoFromResource—message sent by the IP or ISCP software with the result of the preceding SwitchInfoToResource.

ResourceClear—message may be sent by the IP in response to a preceding CallInfoToResource if that preceding message requested that the call be terminated. Also, may be sent by the IP asynchronously to alert ISCP software that the call was terminated by the customer. This message includes a parameter describing the "cause" for terminating the call.

CancelResourceEvent—message sent asynchronously by ISCP software to terminate the conversation. Implies abnormal termination. Normally CallInfoToResource is used to terminate a call.

ExtendedInfoToResource—message sent by ISCP software to the IP to provide a standard format for extending the message set above. In this specification, it is used to extend the message set to include the Play Application with information message.

ExtendedFromToResource—message sent by the IP to ISCP software in response to the in response to the ExtendedInfoToResource message above. A modified protocol specified in Bellcore TA-NWT-001129 includes a similar but somewhat smaller message set which may be used for communications between an ISCP and an SSP as an enhancement over the standard TCAP message set.

As an alternative or in addition to the +1129 protocol, communications between the IP and the ISCP may utilize generic data interface (GDI). The GDI command set is simpler and more generic, and the commands can carry more data. Also, the ISCP can initiate communications using GDI. This permits a wider variety of routing and processing routines. In response to a triggering event, the SSP would again receive instructions to route a call in progress to the IP. However, rather than waiting for a subsequent query from the IP, while the SSP is routing the call the ISCP may instruct the IP to prepare to receive a call on a particular circuit and may forward additional call specific information. For example, for a call which might require speech recognition processing, the ISCP would instruct the IP to retrieve appropriate recognition templates from memory. Other protocols could be used to permit either the ISCP or the IP to initiate communications. According to the instant embodiment of the invention the ISCP may inform the IP of the identity of the RCR which may be associated with the call, or may direct the IP to obtain that information from the DNS.

Typically, a subscriber's party locator over the Internet service is initially set up by a telephone company technician using the Service Creation Environment or SCE in the ISCP 40. As part of this procedure, the technician establishes one or more data tables for the subscriber in the SCP 43. The format of the data tables would be defined by the types of data needed to control the service in the manner selected by the particular subscriber. Any control data which the subscriber wants to apply as fixed data to all calls would also be input by the technician using the SCE. The table templates are then downloaded by the technician into the DNS 51 to create the subscriber's RCR. Subsequently, or in the same session, the subscriber would actually control the service by inputting data to populate the subscriber's data table(s) through an interaction with the peripheral platform or IP, as is presently described.

Figure 13:
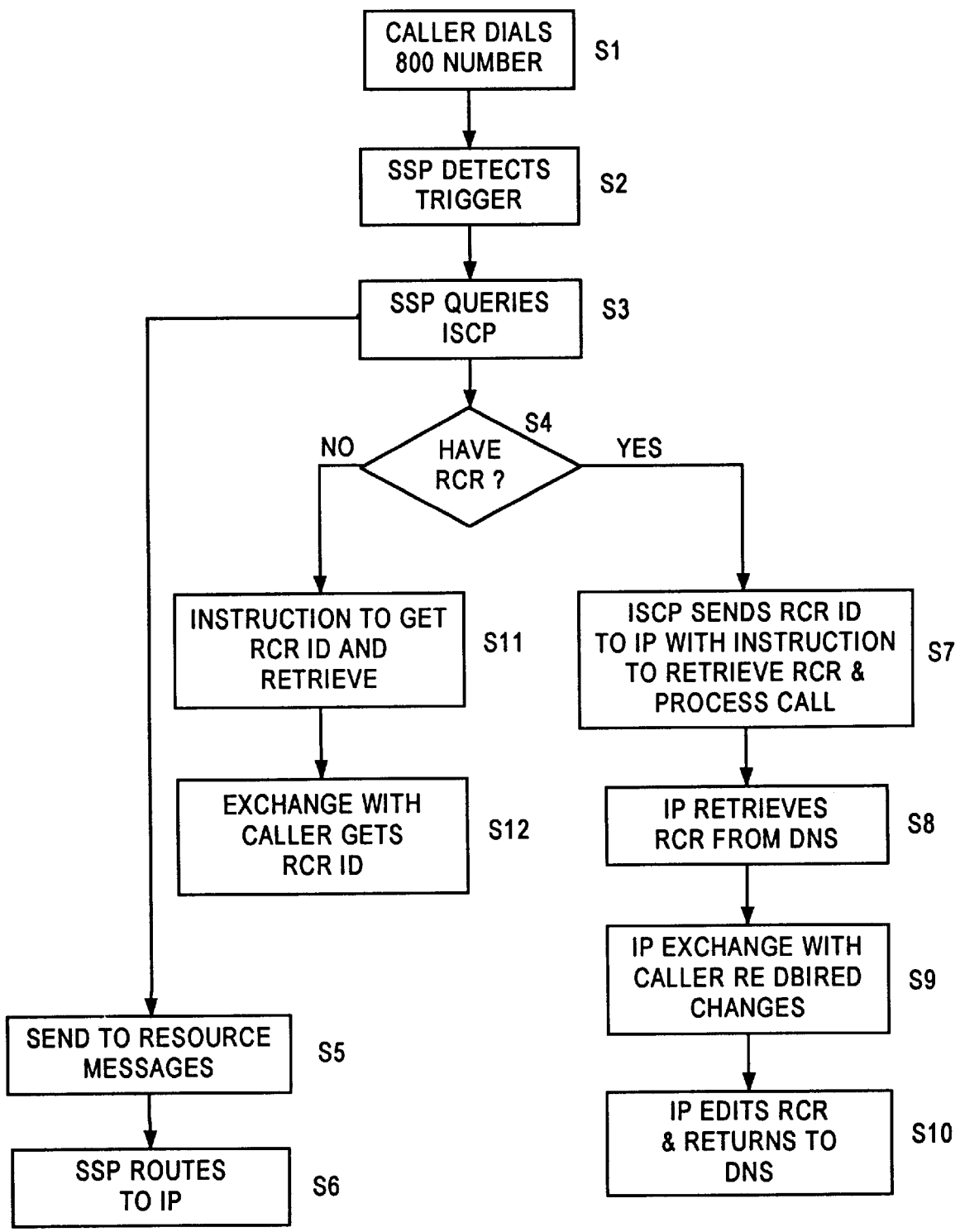
FIG. 13 is a schematic block diagram of an alternate embodiment of an intelligent peripheral for use in the present invention.

The flow chart of FIG. 13 depicts a first mode of operation of the provisioning service in accord with this embodiment of the invention. Subscribers to the called party locator Internet service may be provided with an 800 number to use in order to provision, populate or change their RCRs. An AIN type query and response communication procedure between the SSP and the ISCP is used to route appropriate calls to the IP. Thus a dialed number trigger is set in the SSP for this 800 number. The processing illustrated in FIG. 13 begins at S1 when a caller desiring to change or establish his or her RCR profile dials that 800 (or other designated) number. This may be by way of example, from the telephone 49 in FIGS. 8 and 9. It is an advantage of the present invention that this call may be made from any terminal which is operationally connectable to the telephone network linked to the IPs. If the call is made from a terminal which has an RCR in the DNS database, the ISCP may ascertain this from its own database. The ISCP may then pass this information to the IP immediately upon directing the SSP to connect the call to the IP. In this manner the IP is in a position to immediately retrieve the RCP from the DNS.

At S2 the SSP detects the trigger, suspends the call, and queries the ISCP (S3). The originating SSP sends the TCAP query via a CCIS link to an STP. The STP recognizes that the TCAP query is addressed to the ISCP and retransmits the query, either directly or through a further STP, and the SS#7 links to the ISCP. The query message includes a substantial amount of relevant information, such as the dialed digits and the identification of the telephone line from which the party originated the present call. The process branches at step S4 where the ISCP checks its database to determine whether or not the calling line has a user profile showing that it is associated with an RCR. If it is not associated with an RCR in the records of the ISCP, the ISCP knows that an RCR provisioning call is being handled (by virtue of the specific trigger) but that the call is not being placed from a line associated with or subscribing to the RCR service. However, since the call is an RCR provisioning call the ISCP transmits a Send-To-Resource message to the SSP at step S5. This message directs the SSP to route the call to the IP and this is done at step S6.

Returning to the branch and query at step S4, if the call was made from a line associated with an RCR the ISCP determines the identity of the RCR from its database and sends this information to the IP via the second signaling network. The ISCP also includes in this message instructions for the IP to retrieve the identified RCR from the DNS (step S7). This occurs at step S8. The IP thereupon engages in an interactive voice and DTMF input type procedure with the calling party over the connection established between the calling line and the IP. In this interaction the IP would collect digits for a PIN number and digits for use in editing the RCR in accord with the caller's request. This procedure is shown at step S9. At step S10 the IP returns the edited RCR to the DNS via the second signaling network.

Returning again to the branch and query at step S4, if the calling line is not associated with an RCR in the ISCP database, the ISCP instructs the IP to obtain from the caller the identity of the RCR which it is desired to edit and to proceed with the requested editing. This is shown at step S11. This is shown at step S11. At step S12 the IP engages in voice and DTMF interchange with the caller, obtains the callers PIN number and the ID of the RCR. The process then loops to step S8 and proceeds as shown and previously described in steps S8–S10.

In the above described embodiment of the invention the RCR data base was maintained in the DNS 51. The invention also comprehends that the RCR database may be maintained either in the IP or in the ISCP.

While the foregoing example illustrated the provisioning of the RCR database from the telephone station 49 in FIGS. 8 and 9, it will be appreciated that the process is susceptible of using any telephone station connectable to a telephone network which is in communication with one or more of the IPs and the CCIS network. This includes mobile and PCS stations. In addition the procedure may also be utilized from computers connected to the Internet via a LAN. In the instance of LAN connected computers, such as the computers 35, 36, and 41 in FIGS. 8 and 9, the necessary communication could be carried out from the computer via the LAN, through the Internet to the telephone network such as PSTN LEC-2 in FIGS. 8 and 9. Alternatively the computers on the LAN may communicate with the DNS directly through the Internet. This exchange comprises data messages to and from the computer and its keyboard.

It will be appreciated from the foregoing that the system and method of the invention provide an effective means for locating and establishing Internet telephone and/or data communication with a called party at any one of multiple destinations, including a mobile or roaming physical destination to be determined as described. The called party or subscriber is provided with a convenient provisioning system and method for efficiently establishing or modifying the procedure to be followed in completing calls.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of provisioning a communication service profile for a hybrid network comprising the Internet having a name to address server comprising a domain name server, and a switched telephone network comprising switching systems connected to terminals, and having a separate common channel interoffice signaling network with a service control point controller therefor, and a separate second signaling network with an intelligent peripheral processing unit coupled thereto and coupled to said controller, comprising the steps of:

establishing in a storage associated with said name to address server a service profile for processing calls placed to a subscriber to said service;

initiating a communication from one of said terminals and using signaling in said first signaling network to initiate the establishment of a voice communication link between said one of said terminals and said intelligent peripheral processing unit;

substantially simultaneously with said step of initiating, transmitting from said controller to said intelligent peripheral processing unit via said second signaling network information for processing said initiated communication;

retrieving from said name to address server, and transmitting to said intelligent peripheral processing unit via said second signaling network, service profile data related to said initiated communication;

processing said service profile data pursuant to instructions transmitted from said terminal which initiated said communication; and returning said processed profile data to said name to address server; and wherein said service profile comprises a plurality of names designating addresses for terminals and instructions for calling said addresses.

2. A method according to claim 1 wherein said names comprise domain names and said internetwork comprises the Internet.

3. A method according to claim 2 wherein a plurality of addresses are provided for at least one of said domain names.

4. A method according to claim 3 wherein said service profile includes program data to cause said plurality of addresses to be used seriatim to effect signaling one terminal at a time.

5. A method according to claim 3 wherein said service profile includes program data to cause said plurality of addresses to be used substantially simultaneously to effect substantially simultaneous signaling.

6. In a communication system comprising:
- a packet switched internetwork of communication networks;
- a circuit switched communication network including at least two switching offices, interconnected by trunk circuits, for selectively providing switched communication services over a plurality of communication lines connected thereto;
- a central control device separate from said switching offices, said central control device comprising a database storing call processing data associated with a plurality of said communication lines for control of call processing through one or more of said switching offices; and
- a name to address server coupled to said internetwork for translating names to internetwork addresses, said address server storing service profile information comprising a plurality of names designating addresses for terminals and instructions for calling said addresses;

a service request processing method comprising the steps of:
- receiving a request for service via one of said communication lines;
- providing a voice link connection from said one of said communication lines to a peripheral platform;
- providing instructions from said central control device to said peripheral platform;
- communicating between said central control device and said peripheral platform to identify a service request processing function to be executed by said peripheral platform in response to said request for service;
- communicating between said peripheral platform and said name to address server to access information relating to name to address translation data related to said request for service; and
- executing the identified request for service via communication between said peripheral platform and said name to address server, comprising changing at least one of said name to address translations; wherein
  said name to address translation comprises an Internet domain name to Internet Protocol (IP) address translation.

* * * * *